(12) United States Patent
Suzuki

(10) Patent No.: US 6,630,951 B1
(45) Date of Patent: Oct. 7, 2003

(54) APPARATUS FOR DETECTING HAND MOVEMENT OF AN OPTICAL DEVICE

(75) Inventor: Akira Suzuki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/329,341

(22) Filed: Jun. 10, 1999

(30) Foreign Application Priority Data

Jun. 11, 1998 (JP) .......................................... 10-163769

(51) Int. Cl.[7] .......................... H04N 5/228; G03B 17/00
(52) U.S. Cl. ............................... 348/208.5; 348/208.1; 348/208.2; 396/54
(58) Field of Search ........................ 348/208.5, 208.1, 348/208.2; 396/53, 54

(56) References Cited

U.S. PATENT DOCUMENTS 5,172,236 A     12/1992  Takemoto et al.
5,903,307 A  *   5/1999  Hwang ........................ 348/208
6,127,667 A  * 10/2000  Enomoto ..................... 348/208
6,501,503 B2 * 12/2002  Kudo ...................... 348/208.99
2003/0035053 A1 * 2/2003  Kyuma et al. ........... 348/208.2

* cited by examiner

*Primary Examiner*—Wendy R. Garber
*Assistant Examiner*—Catherine J. Toppin
(74) *Attorney, Agent, or Firm*—Oblon, Spivak, McClelland, Maier & Neustadt, P.C.

(57) ABSTRACT

A hand movement detecting apparatus for a body having imaging elements and an optical unit therein. The hand moment detecting apparatus includes a mechanical movement detecting device for detecting a mechanical moving amount of the body and generating a mechanical movement signal indicating the mechanical moving amount when hand movement occurs, and an image movement detecting device for detecting a moving amount of an object image formed on the imaging elements and generating an image movement signal indicating the image moving amount in response to the mechanical movement signal.

20 Claims, 34 Drawing Sheets

APPARATUS FOR DETECTING HAND MOVEMENT OF AN OPTICAL DEVICE

BACKGROUND OF THE INVENTION

1. Field of the Invention

This invention relates to a hand movement detecting and correcting apparatus for use in a camera or the like, and in particular, relates to a hand movement detecting and correcting apparatus capable of quickly correcting hand movement by detecting mechanical movement of the camera and image movement of an object image formed on an optical image forming device of the camera.

2. Discussion of the Background

In an optical device such as a camera and so on, movement of the optical device caused by hand movement raises a problem. To overcome such a problem, the below described devices have been proposed. First, as illustrated in Japanese Patent Application Publication Number 56-21133, movement of the optical device is suppressed by detecting the movement of the optical device itself using a gyroscope, and by changing a whole or part of the optical unit, for example a lens, to change a position of an optical image in the camera based on the detection. Thus, the hand movement can be compensated for.

Second, as illustrated in Japanese Patent Application laid open No. 7-177419 entitled "Television Camera", an optical image of an object, which is photographed on an image sensing element, is changed when movement occurs in a manner as described below. Namely, first, an object signal of the optical image is obtained from the image sensing element. Second, movement of the object image on the image sensing element as a display is detected when the movement occurs to obtain a movement signal indicating the movement. Third, the optical image is controlled to move in a prescribed direction to compensate for the movement signal based on the detection of the movement. Further, the object image is controlled always to be displayed at a prescribed position in the display of the television or the like even when the movement occurs by cutting a needless displaying area.

These background art systems, however, suffer from drawbacks. Specifically, the first system generally has high costs and makes the optical device bulky. The second system can not detect movement of the optical device in real time. In particular, since detection of movement of an image having two dimensions is generally executed using a pattern matching method for detecting matching of patterns, a complex operation and an excessive time period are required. To simplify the image movement detection, an average of information stored in a prescribed line or column of an image sensing element is used as one dimensional information, and movement of the optical image in a direction of the column or the line is detected to produce two optical images to be compared. However, as a result, a contrast of the optical image is generally decreased.

To overcome the above-mentioned problems, the first type system and the second type system each mentioned above are generally combined with each other to compensate for each others shortcomings. Namely, such a combined system includes a mechanical movement detecting device for detecting mechanical movement of the optical device itself, and an image movement detecting device for detecting object image movement to optionally use each device.

Such a combined system is described, for example, in Japanese Patent Application laid Open Nos. 2-75284, entitled "Photographing Apparatus", 4-163534, entitled "Image Movement Suppressing Apparatus for a Camera", 4-163535, entitled "Image Movement Suppressing Apparatus for a Camera", 4-215623, entitled "Image Movement Suppressing Apparatus for a Camera", and 5-14801, entitled "Image Movement Suppressing Apparatus".

However, the combined device generally has high costs, and does not operate in real time due to a complex movement detecting operation required when detecting an image movement signal indicating movement of an optical image, and can not be precise due to generally using an angular velocity sensor or the like.

SUMMARY OF THE PRESENT INVENTION

In consideration of the above and other problems, it is an object of the present invention to provide a novel hand movement correcting apparatus.

A specific embodiment of the present invention includes a mechanical movement detecting device for detecting a mechanical moving amount of a body and generating a mechanical movement signal indicating a mechanical moving amount when hand movement occurs, an image movement detecting device for detecting a moving amount of an object image formed on imaging elements and generating an image movement signal indicating the image moving amount in response to the mechanical movement signal, and a hand movement correcting device for correcting hand movement based on the image movement signal and the mechanical movement signal.

In another embodiment, a plurality of object images are formed on the imaging elements during the hand movement, and the hand movement detecting apparatus detects the image moving amount based on the pair of the object image signals generated by the imaging elements.

In yet another embodiment, the image moving amount may be detected by detecting a difference in phase of waveforms of the pair of the object image signals.

In yet another embodiment, the image movement detecting device may determine timing of imaging of the object image based on the mechanical movement signal.

In yet another embodiment, the image movement detecting device may generate a plurality of object image signals by periodically forming a plurality of object images on the imaging element, and select a pair of object image signals to compare the image moving amount.

In yet another embodiment, the image movement detecting device may change an angle of an optical axis of the optical unit based on the mechanical movement signal, and may then detect an image moving amount by detecting object image signals generated after the change of the optical axis.

In yet another embodiment, the image movement detecting device may detect an image moving amount moved in a direction different when a prescribed amount of the mechanical movement is detected.

In yet another embodiment, the mechanical movement detecting device may output a signal as a mechanical movement signal indicating an inclination level of a body about a gravity direction.

In yet another embodiment, the mechanical movement detecting device may output a signal indicating a velocity angle of the body as a movement signal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments of the present invention are now explained using a typical example of a digital camera, referring to the several drawings, wherein like numerical numbers and marks indicate similar or corresponding parts throughout the several views.

Figure 1:
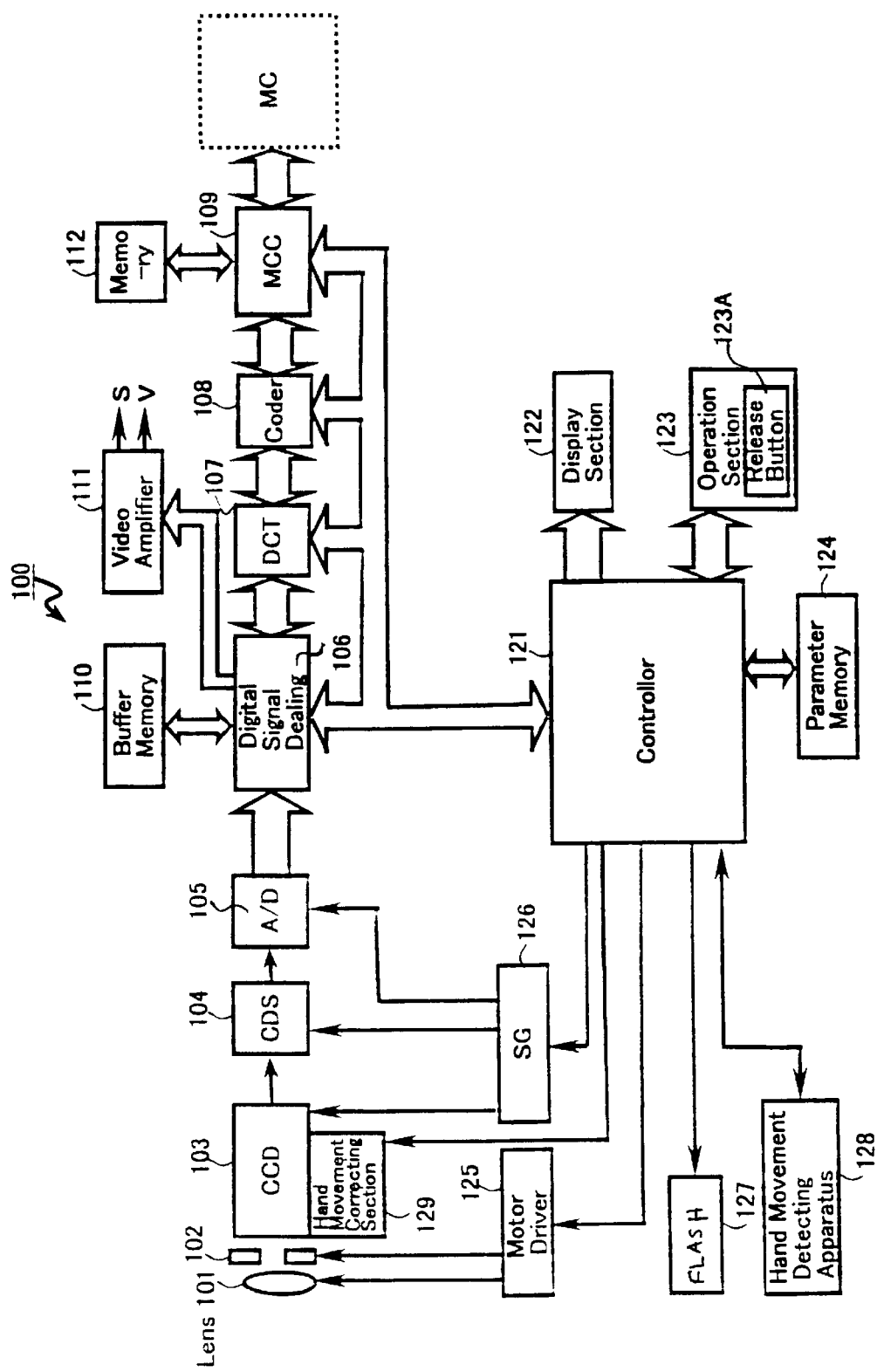
FIG. 1 is a block chart that illustrates a constitution of one example of a digital camera of the present invention.
Figure 2:
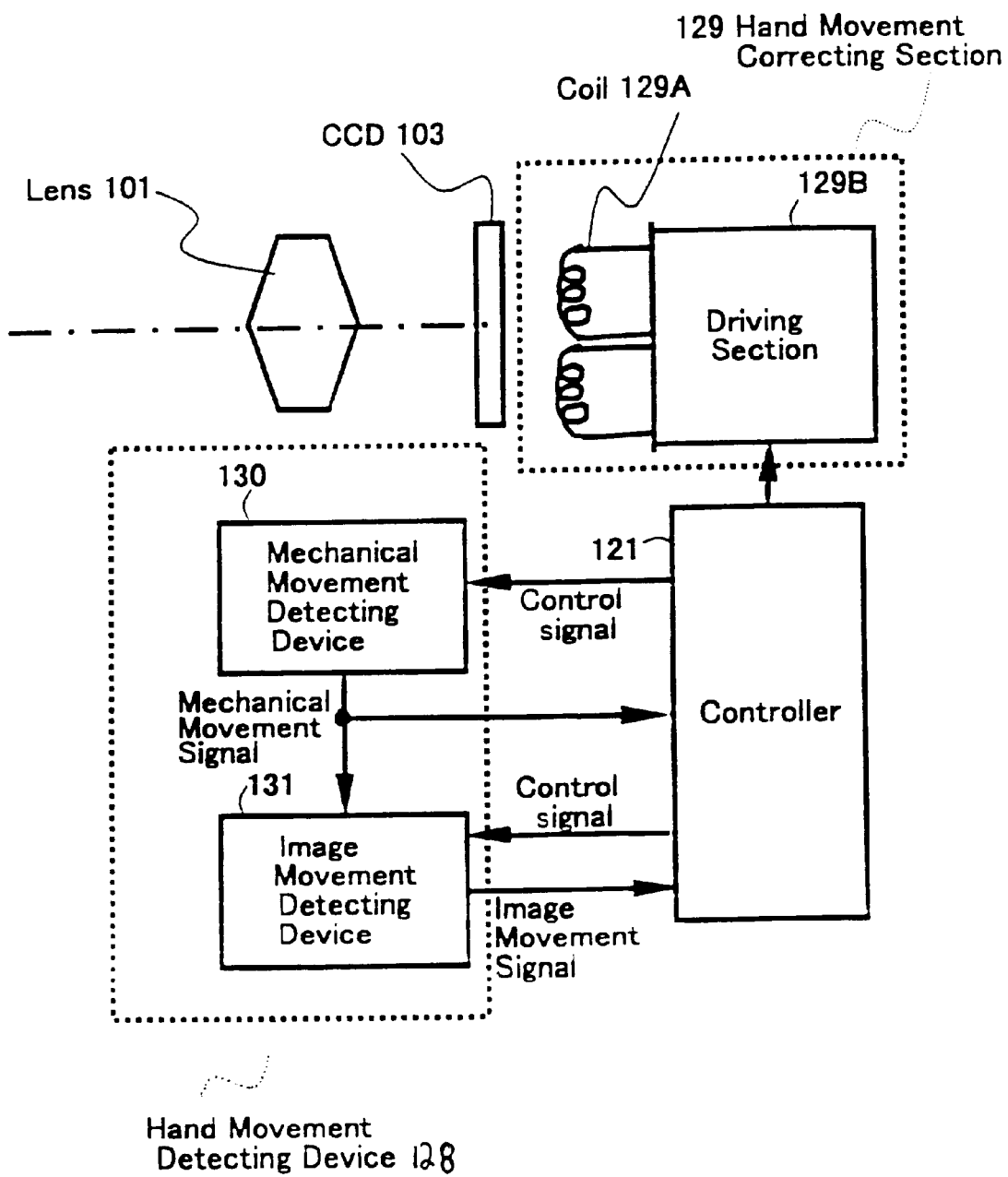
FIG. 2 is a block chart that illustrates a constitution of a hand movement correcting apparatus used in the digital camera illustrated in FIG. 1.
Figure 3:
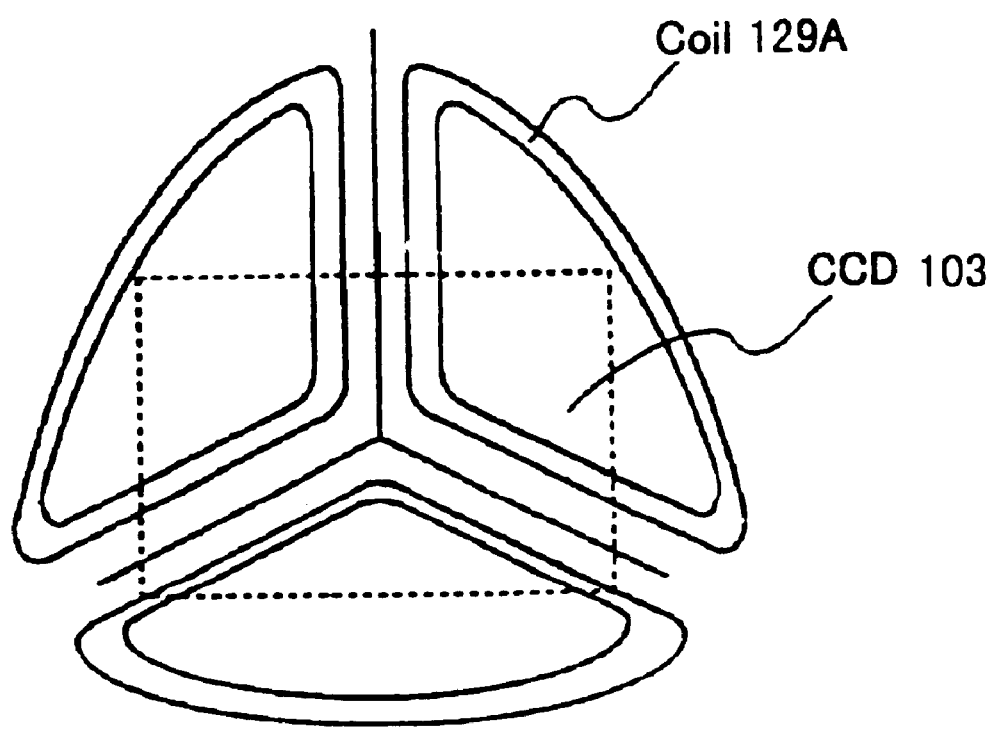
FIG. 3 is a chart that illustrates a constitution of a moving coil for moving a CCD disposed in the hand movement correcting apparatus illustrated in FIG. 2.

A first example of the present invention is explained referring to FIGS. 1 through 3. FIG. 1 illustrates a construction of a digital camera using a block chart. The digital camera 100 may include a lens 101, a mechanism 102 including an auto focusing device or the like, and a charge coupled device (hereinafter referred to as a CCD) 103. Further, a correlation double sampling circuit (hereinafter referred to as a CDS) 104, an analog to digital convertor (hereinafter referred to as an A/D convertor) 105, and a digital signal dealing section 106 are included in the digital camera 100.

A discrete cosine transformer (hereinafter referred to as a DCT) 107, a Huffman encoder/decoder (hereinafter referred to as a coder) 108, and a memory card controller (hereinafter referred to as a MCC) 109 connected to a memory card MC are included therein. The digital camera 100 may further include a buffer memory 110, a video amplifier 111, and an internal memory 112. The digital camera 100 may further include a controller 121, a display section 122, an operation section 123, and a parameter memory 124. A motor driver 125, a SG section 126 for generating a control signal, a hand movement detecting device 128, and a hand movement correcting section 129 may be included in the digital camera 100.

A lens unit may be constituted by the lens 101, and the mechanism 102 may be constituted by a diaphragm, a filter section, and so on, beside the auto focusing device. The mechanism 102 may further include a mechanical shutter for simultaneously exposing two fields of line sensors. The CCD 103 may convert image information input through the lens unit into an electrical signal having analog image data.

The CDS circuit 104 may lower a noise of a CCD type imaging element. The A/D convertor 105 may convert the analog data input by the CCD 103 via CDS circuit 104 into digital image data. Namely, an output signal of the CCD 103 may be converted into a digital signal at a most preferable sampling frequency, for example a frequency having a prescribed times of an integral number of a sub-carrier frequency of the NTSC signal, by the A/D convertor 105 via CDS circuit 104.

The digital signal dealing section 106 may apply a variety of data dealing to the image data by separating brightness data and color difference data from the digital image data. Further, data correction, and data condensation/extension is applied thereto. The DCT 107 may apply a discrete cosine transforming operation to the data, which is one process of the image condensation/extension to be executed based on the standard of JPEG. The coder 108 may execute compounding of the data, and decoding of the data into Huffman code.

The MCC 109 may store image data, to which an image condensation process is applied, and sound data taken in through a microphone (not shown) and changed into a digital state. The MCC 109 may execute simultaneous data dealing, and write the data into the inner memory 112 or the memory card MC, and read data therefrom. The controller 121 may control each section of the digital camera 100 in response to an instruction from the operation section 123 and a remote controller or the like (not shown). Also, a flash 127 is connected to the controller 121.

The display section 122 may be constituted, for example, by a liquid crystal display, a light emitting diode, an electro luminescent, etc. The displaying section 122 may display digital image data photographed, and written image data, to which the expansion process is applied. Further, the displaying section 122 may display a condition of the digital camera and so on. The operation section 123 may include a plurality of buttons, for example, for setting a prescribed function of the digital camera, instructing a photographing operation, and externally setting a variety of modes of the digital camera. The operation section 123 may include a release button 123A for outputting a release signal to the controller 121 when depressed.

The hand movement detecting apparatus 128 may detect hand movement of the camera and output a detection signal to the controller 121. The hand movement correcting section 129 may move the CCD 103 to a prescribed direction to correct for the hand movement detected by the hand movement detecting apparatus 128. In the above, the hand movement detecting apparatus 128, the hand movement correcting section 129, and the controller 121 may collectively constitute the hand movement correcting apparatus.

FIG. 2 illustrates a construction of the hand movement correcting apparatus of the digital camera. The hand movement detecting apparatus 128 may include a mechanical movement detecting device 130 for detecting mechanical movement of the digital camera 100, for example in the direction of gravity, and outputting a movement signal to both a below described image movement detecting device 131 and the controller 121.

The hand movement detecting apparatus 128 may further include the image movement detecting device 131 for detecting image movement of an image of an object, for example in a horizontal direction, in response to the detection of the mechanical movement and for inputting an image movement signal indicating an amount of the image movement to the controller 121. Both the mechanical movement detecting device 130 and the image movement detecting device 131 are explained later in detail.

The controller 121 may have the hand movement correcting section 129 operate to correct the hand movement by compensating for the hand movement amount based on both the mechanical movement signal and the image movement signal.

The hand movement correcting section 129 may include a moving coil 129A as illustrated in FIG. 3 for moving the CCD 103 in prescribed directions, and a driving section 129B for driving the moving coil 129A. The hand movement correcting section 129 may be controlled by the controller 121 to move the CCD 103 to compensate for the detected hand movement by offsetting the amount of the hand movement.

A part of the optical unit beside the CCD 103 can be moved for the CCD 103 to correct for the detected hand movement. An actuator such as a piezoelectric element or the like can be employed for the moving coil 129A to correct for the detected hand movement. Thus, a position of the object image can be identified, and since the detection of the image movement is started only when the mechanical movement is detected, the detecting operation of the image movement signal can be highly quickly executed precisely.

Hereinbelow, a second example of the image movement detecting apparatus 131 is explained referring to FIGS. 4 though 11. A basic construction of a digital camera, to which this example is applied, is substantially the same as in the first example.

Figure 4:
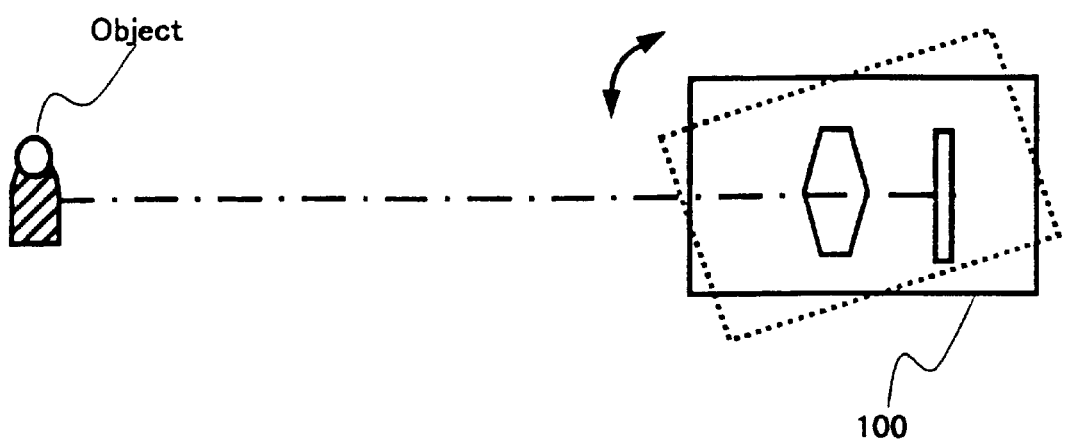
FIGS. 4, 5, 6, and 7 are charts that illustrate a principle of detecting the hand movement in another embodiment of the present invention.
Figure 5:
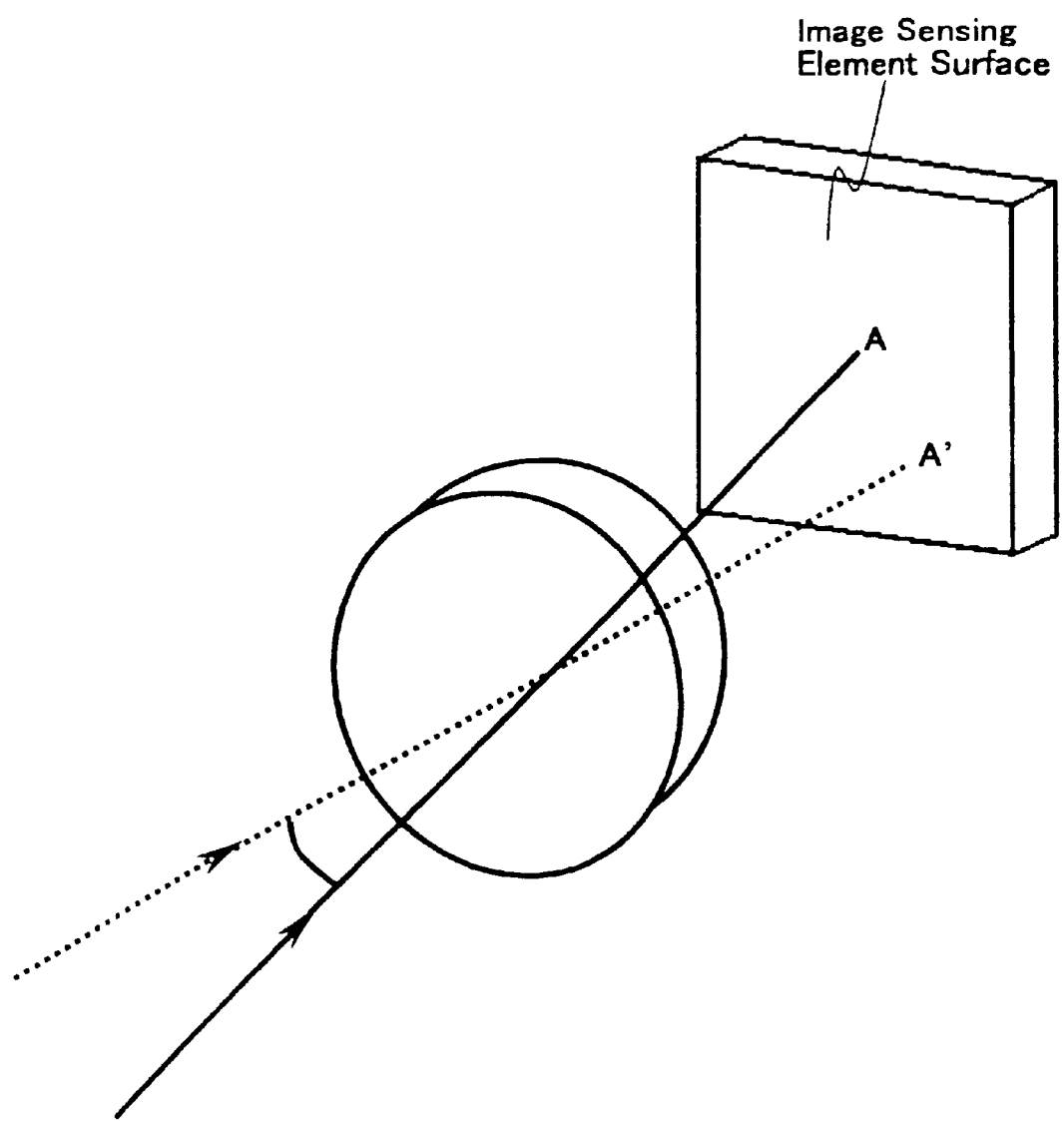
Figure 6:
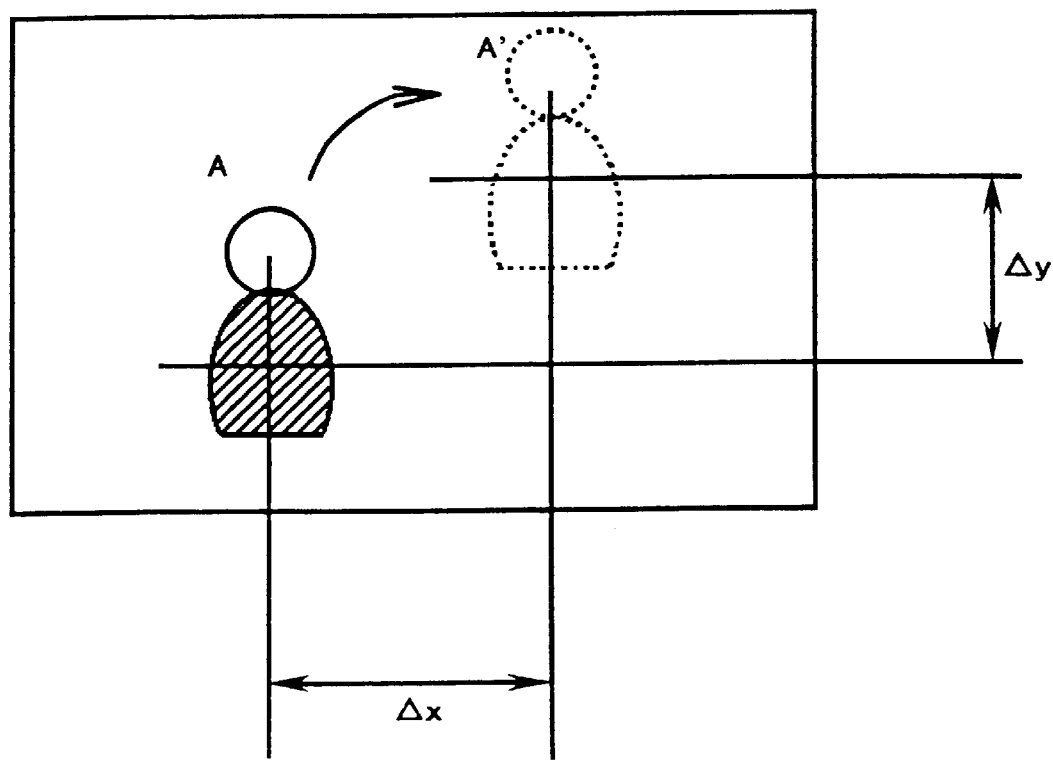

First, a method of detecting hand movement is explained referring to FIGS. 4 through 6. As illustrated in FIG. 4, when the digital camera 100 is moved with regard to an object to be photographed by hand movement or the like, an angle of a ray of light reflected from the object may change as illustrated in FIG. 5. Namely, an image of the object formed on the CCD 103 changes its position from an original position A to a position A' after a time period $\Delta t$ of an order of a few milli-seconds has elapsed. When representing the movement of the object image on the surface of the CCD 103, the object image positioned at the position A moves to the position A' as illustrated in FIG. 6.

Thus, the object image moves by $\Delta X$ in a direction of an axis X, and $\Delta Y$ in a direction of an axis Y on a two dimensional plane. Thus, if moving amounts of both $\Delta X$ and the $\Delta Y$ are detected, the moving direction and the amount of movement of the object image can be detected.

Figure 7:
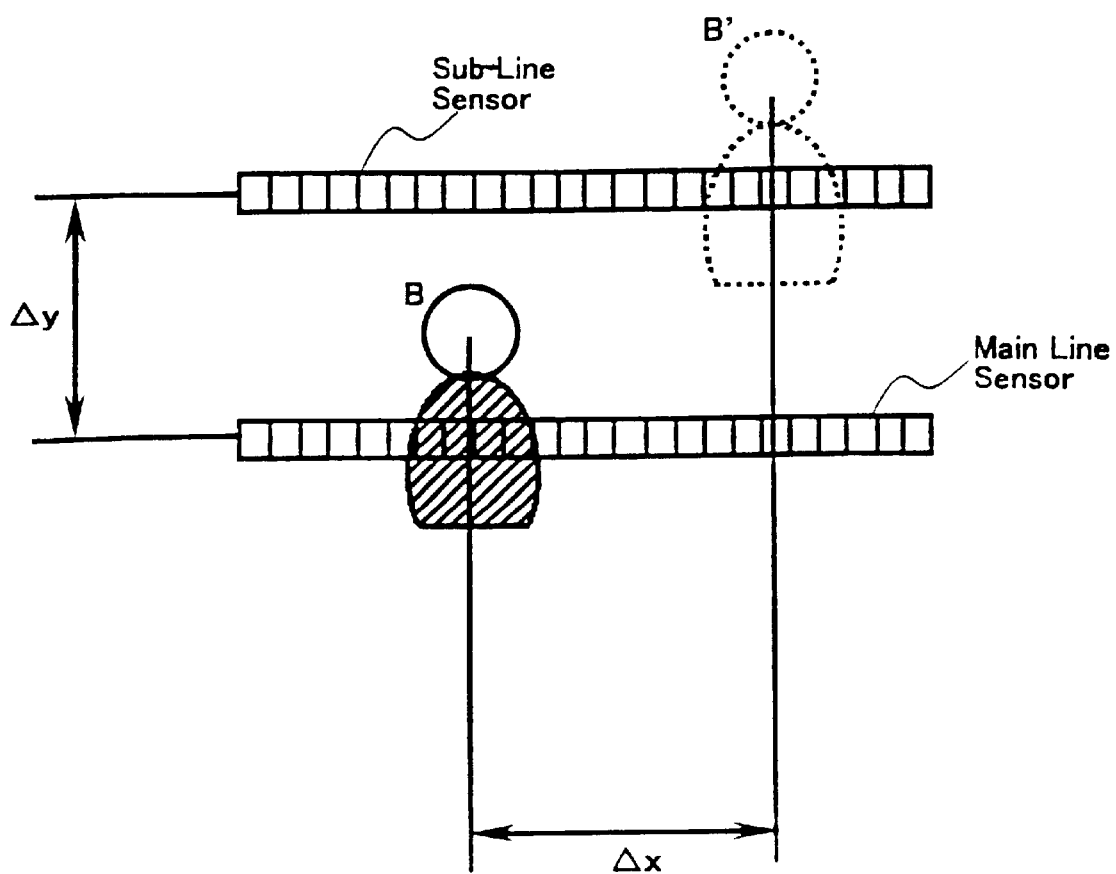

FIG. 7 illustrates one example of a detecting section of the imaging elements as an image movement detecting device 131 of the second example. An image movement detecting device 131 may include a pair of line sensors as main and sub-line sensors disposed at a prescribed interval of $\Delta Y$. When the object image originally positioned at a position B moves to a position B' by moving the amount of $\Delta X$ in a direction of the axis X, and the amount of $\Delta Y$ in the direction of the axis Y as a result of hand movement, the amount of $\Delta X$ may be detected by the image movement detecting device 131 in a manner as described below. First, the main line sensor of the image movement detecting device 131 may detect the object image positioned at the position B, which is moved by a previously occurred hand movement.

Secondly, the mechanical movement detecting device 130 explained later in detail may start a detecting operation for detecting an amount of mechanical movement $\Delta y$ of the digital camera 100, which corresponds to the interval $\Delta Y$ between two line sensors when hand movement continuously occurs. When $\Delta y$ is detected, the image movement detecting device 131 may detect the object image, then moving from the position B to the position B', using the sub-line sensor to compare both object image signals detected.

Figure 8:
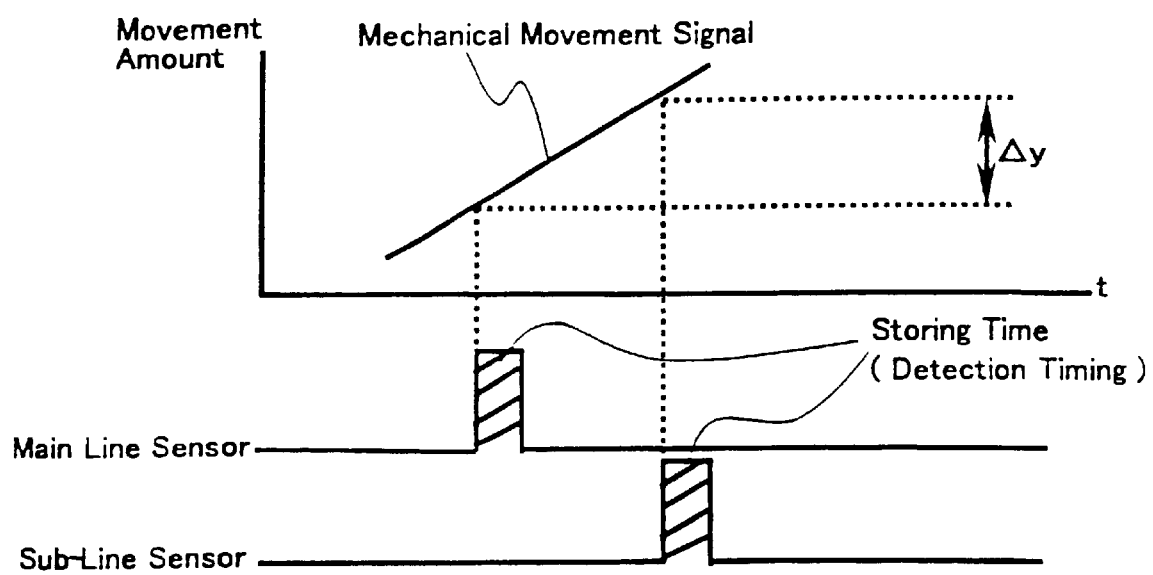
FIGS. 8 and 9 are timing charts that illustrate detecting timings for detecting object image signals generated by both a main and sub-line sensors of imaging elements as an object movement detecting device when hand movement occurs in an embodiment of FIGS. 4–7.

FIG. 8 illustrates detection timings of the object image by the image movement detecting device 131. As illustrated in FIG. 8, after the main line sensor detects the object image signal generated by the previously occurred hand movement, the mechanical movement detecting device 130 may start a detecting operation of mechanical movement having a moving amount $\Delta y$. When the mechanical movement detecting device 130 detects the moving amount $\Delta y$, the sub-line sensor may detect the moved object image. Thus, with reference to FIG. 9, both object image signals C and C' having a prescribed phase shift are obtained by the main and the sub-line sensors respectively.

Figure 9:
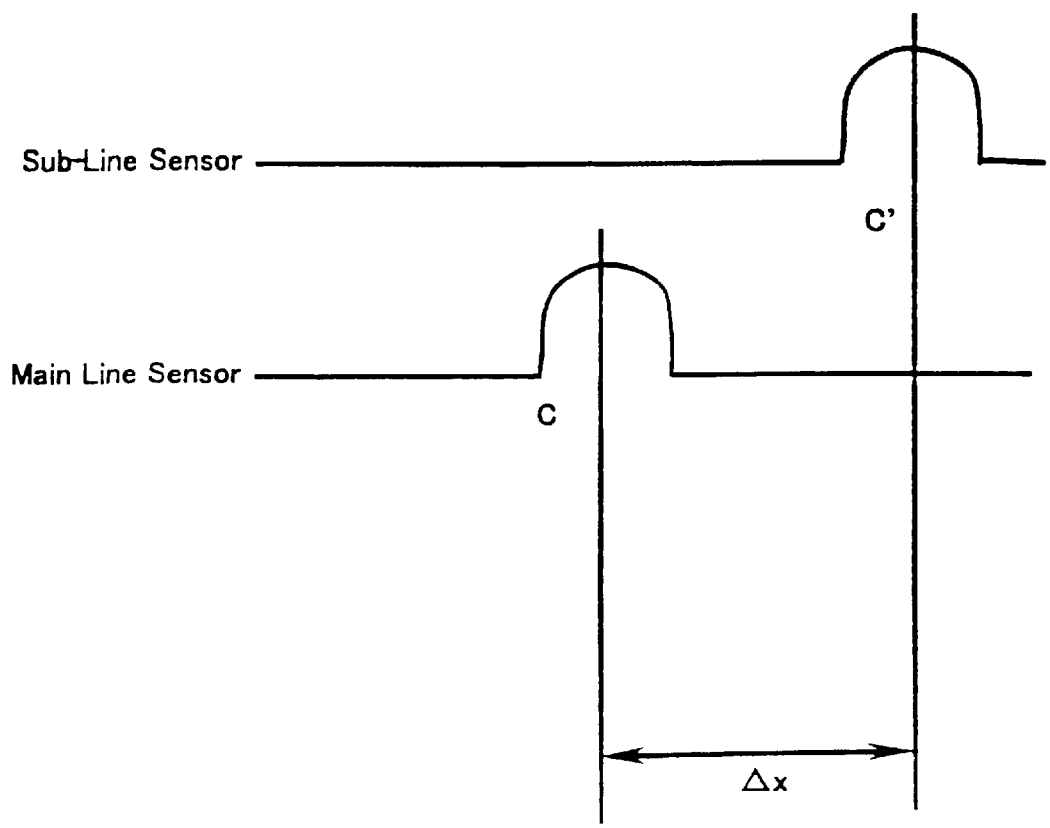
Figure 10:
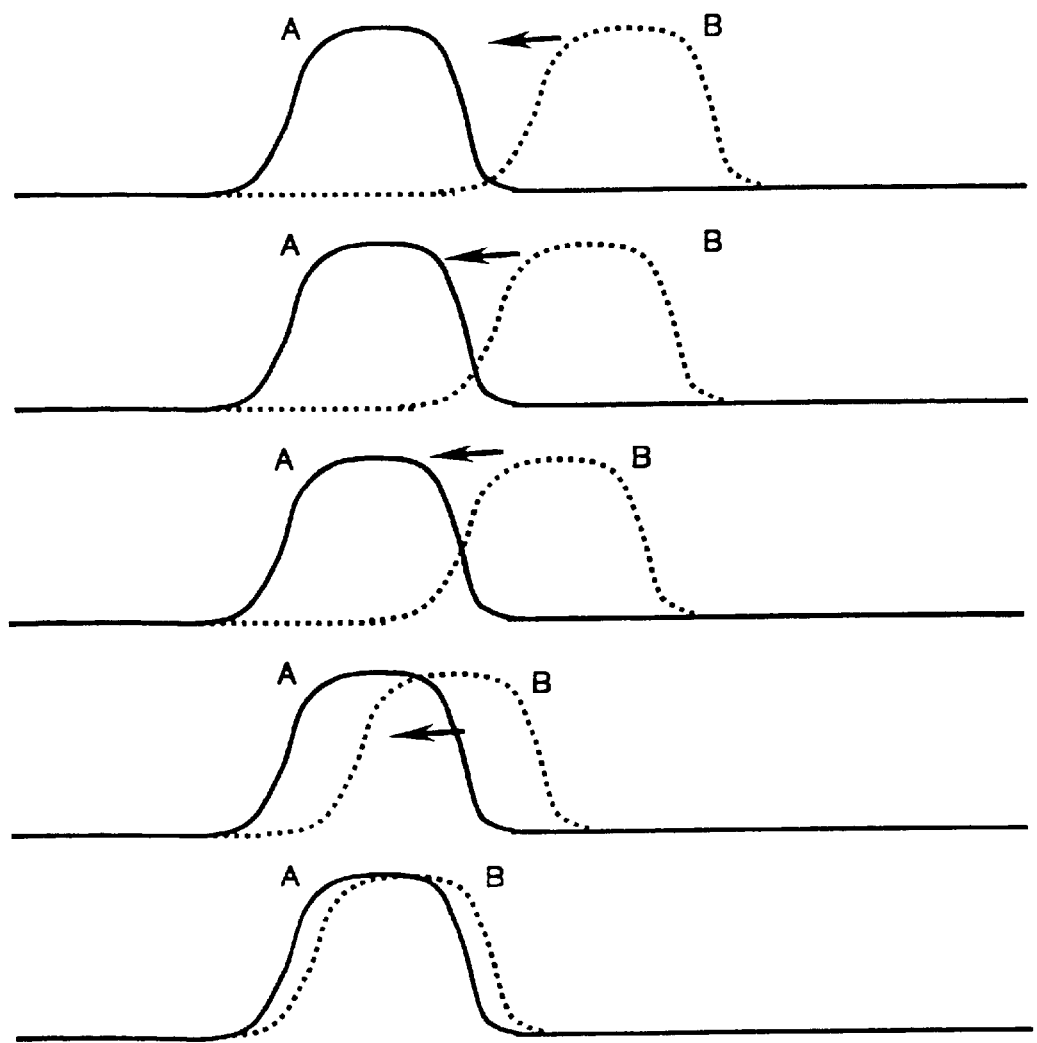
FIGS. 10 and 11 are charts for explaining a principle of detecting a phase difference between two object image signals generated at the timing illustrated in FIGS. 8 and 9.

Hereinbelow, a method of detecting the phase shift between the two object image signals generated by the pair of line sensors, which corresponds to the moving amount $\Delta X$ illustrated in FIG. 9, is explained referring to FIG. 10. For example, a correlation phase matching detection system generally used in an auto focusing technology is employed. Namely, as illustrated in FIG. 10, when obtaining a difference of phases between the two object image signals of A and B, one waveform of A or B is electrically moved and a level of coincidence of both signal waveforms of A and B is detected. A shifting amount of one of the object images is obtained as a phase shift of ΔX when both waveforms are mostly coincident with each other.

The level of the coincidence of both the object images A and B can be represented by the below described formula (1).

$$\Sigma|A-B| \quad (1)$$

Figure 11:
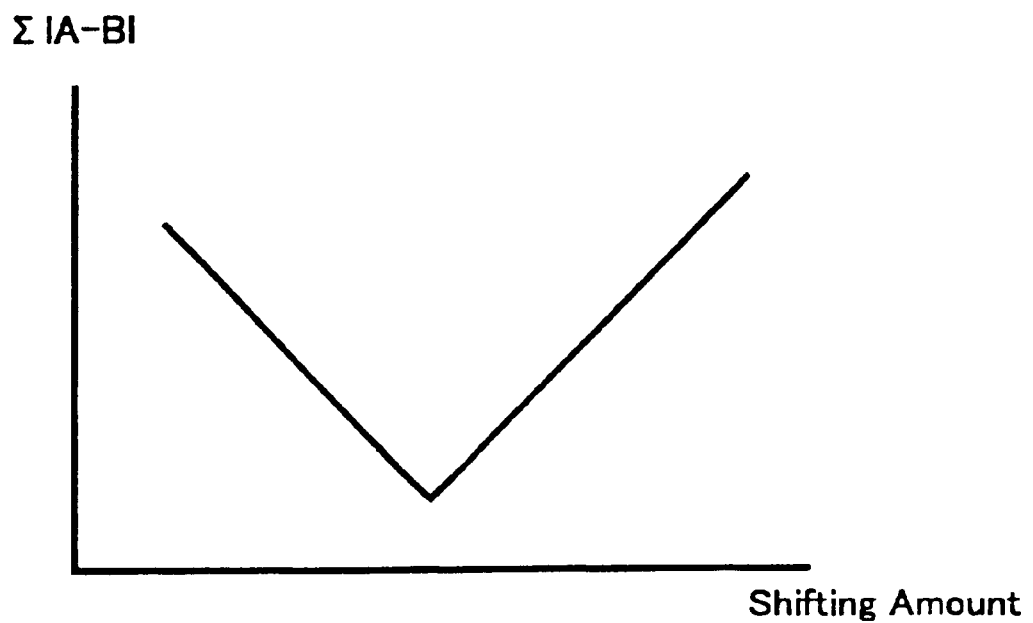

A relation between the formula (1) and a phase shifting amount is illustrated in FIG. 11 using a graph. Both the object images signals A and B are regarded to be coincident with each other when a calculation result of the formula becomes smallest as illustrated in FIG. 11. The shifting amount at the time may correspond to the difference of the phase shifting amount ΔX.

Thus, since the image movement detecting device 131 determines timing of imaging of the object on the line sensor, and detects the object image signal to be compared, the image movement detecting device 131 can be simple, and thereby not costly.

Hereinbelow, a third example of the image movement detecting device 131 is explained referring to FIGS. 12 through 16. In this example, the image movement detecting device 131 may repeatedly form object images on line sensors thereof during hand movement at a prescribed interval of time. A basic constitution of a digital camera, to which this example is applied, is substantially the same as employed in the first example.

Figure 12:
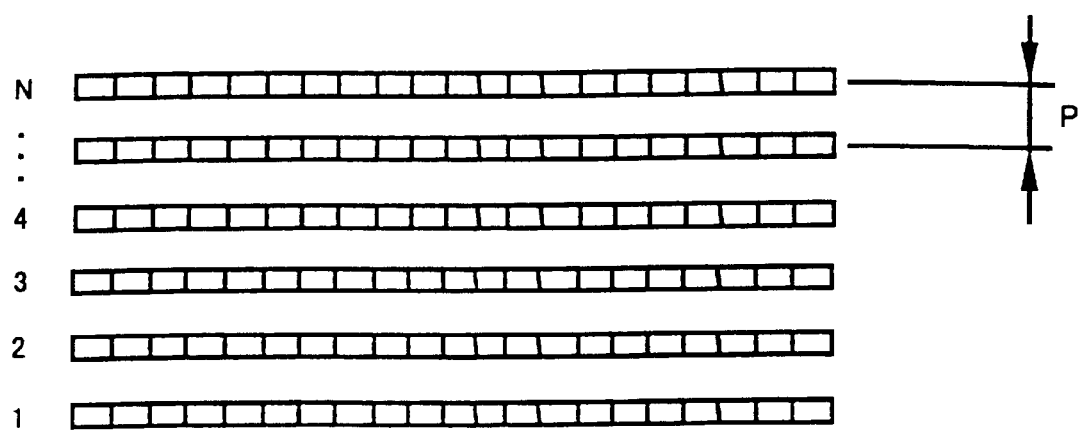
FIG. 12 is a chart that illustrates a constitution of an image movement detecting device of yet another embodiment of the present invention.

FIG. 12 illustrates a constitution of a detecting section of the image movement detecting device 131 of the third example. The image movement detecting device 131 may include a plurality of line sensors from 1 through N vertically arranged with each line sensor disposed at a prescribed interval P. The mechanical movement detecting device 130 may detect a mechanical moving amount Δy' of the digital camera 100, which is moved during a prescribed time period, and the image movement detecting device 131 illustrated in FIG. 12 may detect an object image formed on a prescribed line sensor moved from an original position, which corresponds to the moving amount Δy' detected by the mechanical movement detecting device 130.

Figure 13:
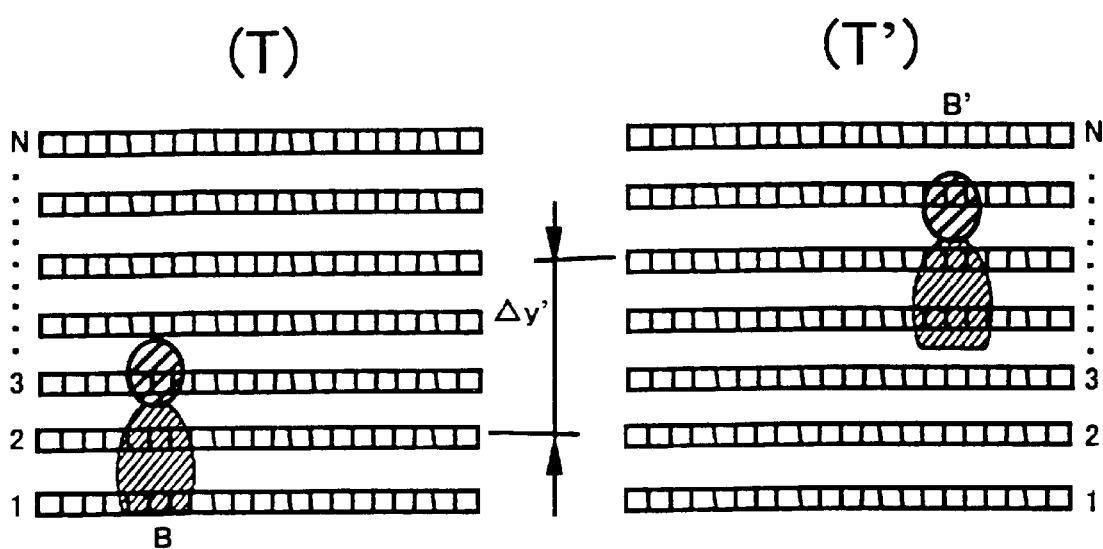
FIG. 13 is a chart for explaining a principle of detecting an image moving amount employed in the embodiment illustrated in FIG. 12.

FIG. 13 explains a principle of image movement detection to be executed by the image movement detecting device 131 illustrated in FIG. 12. As illustrated in FIG. 13, an object image is first positioned at a prescribed position B, and moves to a position B' when hand movement or the like occurs. The moving amount Δy' of the digital camera, which corresponds to an interval between line sensors having object images B and B' respectively thereon can be represented by the following formula (2).

$$\Delta y' = P(\text{constant interval}) \cdot \Delta I(\text{number of line sensors}) \quad (2)$$

Since P is constant, the above formula (2) can be represented in a different manner as described below (3).

$$\Delta I = \Delta y'/P \quad (3)$$

The moving amount Δy' may be detected by the mechanical movement detecting device 130 during a prescribed time period. As illustrated in FIG. 13, when the hand movement Δy' occurs the object image B positioned on the line sensor (N=2) moves to a line sensor (N=2)+ΔI.

The image movement detecting device 131 may extract object image signals of the object images B and B' generated by the line sensors N=2 and ((N=2)+ΔI) respectively, and detect the moving amount ΔX by comparing both the object image signals using the above mentioned correlation phase matching method. Thus, the image movement detecting device 131 can detect the moving amount ΔX by comparing an object image signal generated by a prescribed line sensor at a time and an object image signal generated by the line sensor displaced from the prescribed line sensor by the interval Δy'. Thus, the image movement signal can be continuously detected in this example.

Figure 14:
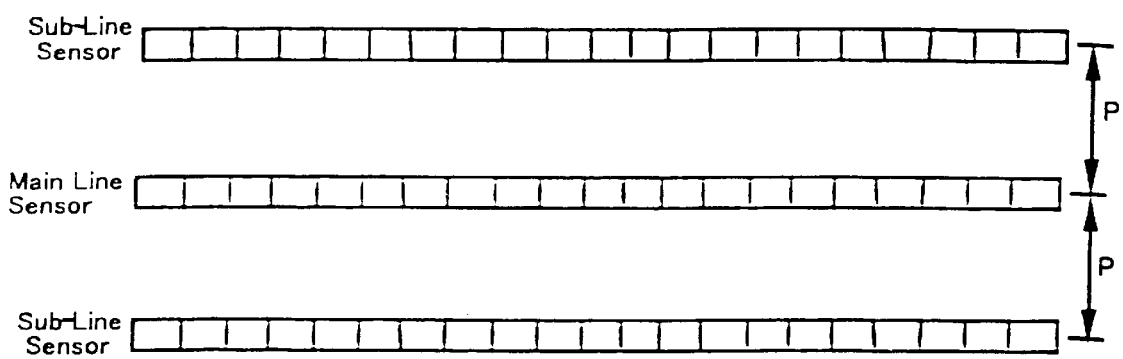
FIG. 14 is a chart that illustrates a modification of the image movement detecting device illustrated in FIG. 13.

FIG. 14 illustrates a slightly modified image movement detecting device 131. The modified image movement detecting device may include two sub-line sensors arranged above and below a main line sensor to always detect an object image even if the object image moves both up and down.

If the image movement detecting device 131 uses the line sensors illustrated in FIG. 7 for the line sensor illustrated in FIG. 14, a first priority as a main line sensor may be automatically given to one of the line sensors corresponding to a moving direction of the object image. Namely, as illustrated in FIG. 7, when the object image moves upward the lower sub-line sensor is regarded as a main line sensor and stores electrical charge therein for a detection of an object image signal prior to the upper side line sensor. The upper sub-line sensor then operates in a same manner. The above operations of the line sensors are oppositely started when the object image oppositely moves downward.

Figure 15:
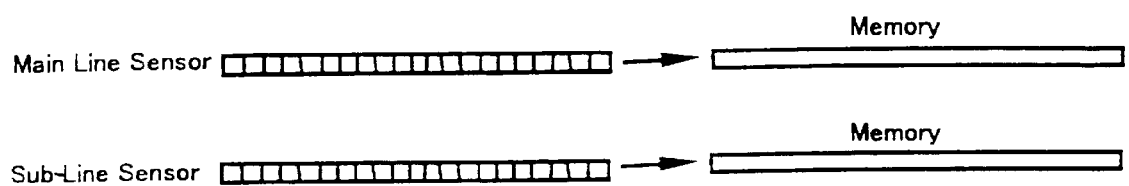
FIG. 15 is a chart that illustrates yet another modification of an image movement detecting device of the present invention, in which a pair of line memories is used.
Figure 16:
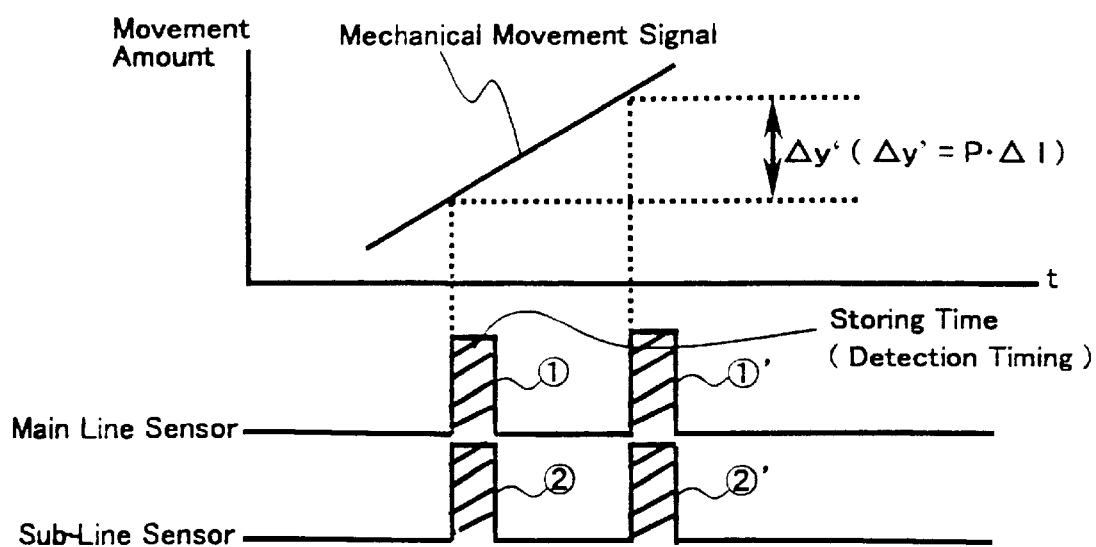
FIG. 16 is a chart illustrating timings of detection of an object image signal with respect to the embodiment of FIG. 15.

FIG. 15 illustrates yet another modification of the image movement detecting device 131. In this modification, the modified image movement detecting device 131 may include a pair of line memories each connected to main and sub-line sensors correspondingly for storing object image signals therein. FIG. 16 illustrates timings of the detection of the object image signal. As illustrated in FIG. 16, a plurality of object image signals are first generated at timing ① or ② in both main and sub-line sensors, and a plurality of object image signals are then generated at a time ①' or ②' therein after a prescribed time period has elapsed during hand movement.

When a mechanical movement signal indicating a moving amount Δy' of the body, which is detected by the mechanical movement detecting device 130 mentioned later in detail, is large enough such that a reference point of the object image moves by a distance more than an interval P of the line sensors, both combinations of the object image signals ① and ②', and ①' and ② each stored in the corresponding line memory, are compared corresponding to a moving direction of the object image to generate an image movement signal indicating Δx.

Further, if the mechanical moving amount of the object image is smaller than the interval P, and accordingly a reference point of the object image does not reach the sub-line sensor, an object image signal is generated by a same lime sensor, namely the main line sensor, at an interval shorter than the time period between timings of ① and ①' or ② and ②' under a control of the controller 121. Then, both object image signals are compared with each other to detect the image moving amount Δx.

The above mentioned image movement detecting devices can be optionally combined to generate an image movement signal. For example, a plurality of line sensors as illustrated in FIG. 12 can be used as an image movement detecting device 131, and a plurality of object images are periodically formed a plurality of times before the mechanical moving amount Δy' is detected when a prescribed time period has elapsed, and an object image signal generated by a prescribed line sensor can be compared with that of the main line sensor as explained in FIG. 16.

Further, in the above, if a movement signal is large enough, a prescribed sub-line sensor having a distance corresponding to the moving amount $\Delta y'$ from the previously charged line sensor can be charged.

If a moving amount is relatively small, an object image forming signal is forcibly transmitted from the controller 121 to the image movement detecting device 131 as illustrated in FIG. 2 such that a prescribed sub-line sensor having a smaller distance may image the object therein. Thus, the image movement detecting device 131 can compare object image signals obtained from the pair of line sensors.

Hereinbelow, a fourth example of the image movement detecting device 131 is explained referring to FIGS. 17 and 18. In this example, the mechanical movement detecting device 130, explained later in detail, may detect component Y of a mechanical movement signal, and an imaging element (CCD) disposed in the image movement detecting device 131 is correspondingly moved in a direction Y to compensate for object image movement indicated by the component Y, so that only detection of movement of the object image in a direction X, for example a horizontal direction, by the image movement detecting device 131 is required for the purpose of correction of the hand movement. A basic constitution of the digital camera 100, to which this example is applied, is substantially the same as in the first example.

Figure 17:
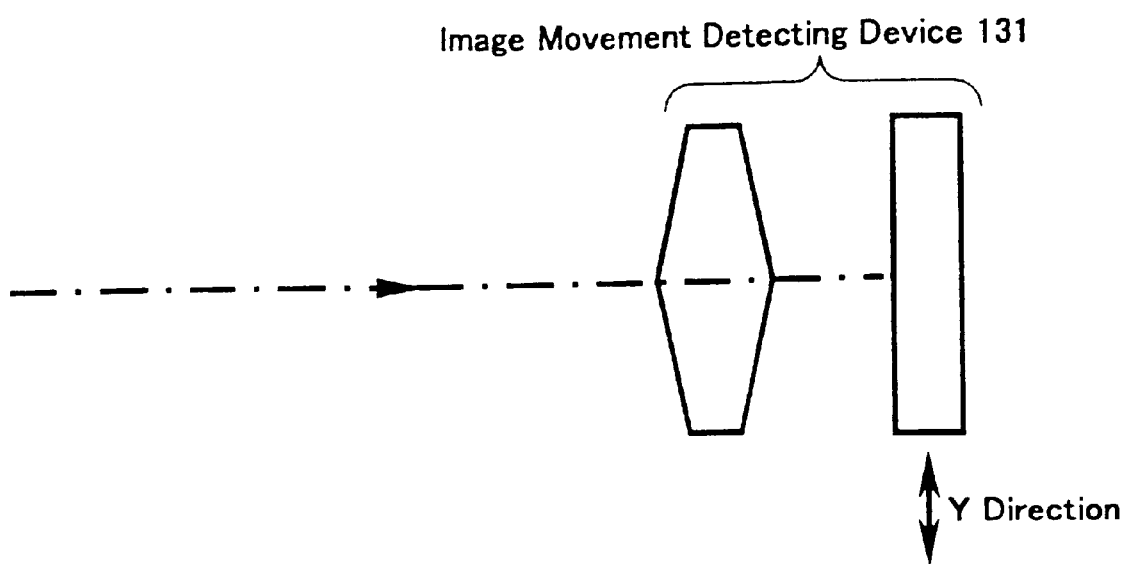
FIG. 17 is a chart that illustrates a constitution of yet another embodiment of the present invention, in which a CCD of the image movement detecting device moves to cancel a mechanical movement.
Figure 18:
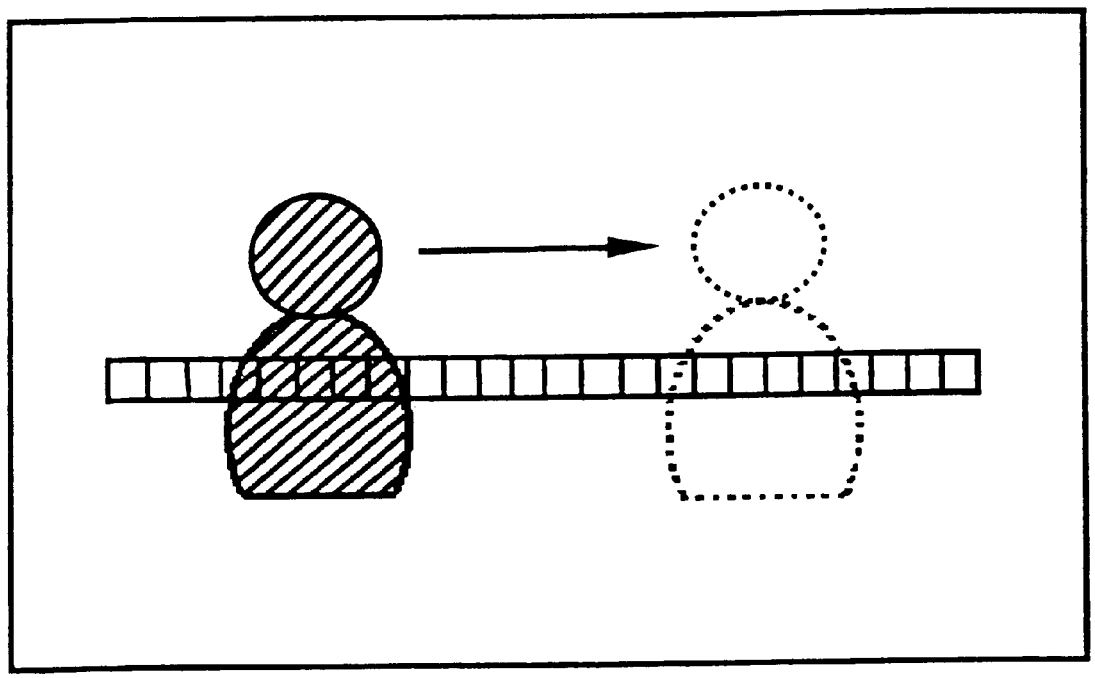
FIG. 18 is a chart that illustrates a constitution of the image movement detecting device illustrated in FIG. 17.

FIG. 17 typically illustrates the fourth example of the image movement detecting device 131. FIG. 18 illustrates a constitution of a detecting section of the image movement detecting device 131 illustrated in FIG. 17. As illustrated in FIG. 18, the image movement detecting device 131 may include only one line sensor.

First, the mechanical movement detecting device 130 may detect a component Y of a movement signal when hand movement or the like occurs. The image movement detecting device 131 having the imaging element (CCD) is correspondingly moved in the direction Y by a prescribed amount to offset a component Y of the moving amount of an object image formed on the image movement detecting device 131 (not shown). Thus, as illustrated in FIG. 18, the object image only moves along the line sensor, and object image signals are obtained in a time series to be compared with each other so that moving amount $\Delta X$ can be detected.

Hereinbelow, a fifth example of the image movement detecting device 131 is explained referring to FIG. 19. A basic constitution of the digital camera, to which this example is applied, is substantially the same the first example. Further, in this example, the image movement detecting device 131 may detect image movement signals after an optical axis of the optical unit is changed as mentioned below in detail.

Figure 19:
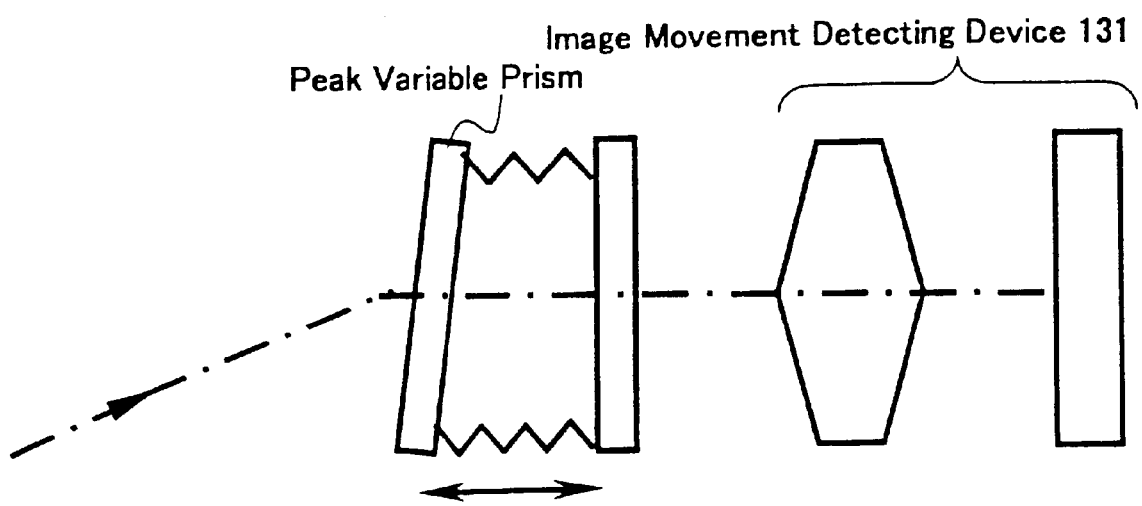
FIG. 19 is a chart that illustrates a constitution of a modification of the image movement detecting device illustrated in FIG. 17, in which a peak variable prism is used to cancel the mechanical movement.

FIG. 19 typically illustrates a constitution of devices around the image movement detecting device 131. As illustrated in FIG. 19, a peak angle variable prism is arranged at a left side of the optical unit. An angle of the peak angle varying prism is varied based on a mechanical movement signal detected by the mechanical movement detecting device 130 to change the optical axis. Then, the image movement detecting device 131 may detect a moving amount of an object image based on object image signals generated by a line sensor (not shown) after the optical axis is changed.

Thus, the peak angle variable prism may cancel a change in the optical axis created by the hand movement by moving a portion of the optical unit during the hand movement. The peak angle variable prism may include a pair of plate-like glasses facing each other and bellows for connecting both plate-like glasses, wherein the bellows may be made of a special film like member. The peak angle variable prism may further include transparent liquid having a high refractive index, which is filled in a space defined by both the plate like glasses and the bellows. The pair of plate-like glasses is kept in parallel with each other when hand movement does not occur. When hand movement occurs the peak angle is changed to compensate for a change in a view caused by the hand movement by shifting the view from the optical unit. Thus, the imaging element can be simple, and does not have high costs.

Hereinbelow, a sixth example of the image movement detecting device 131 is explained referring to FIG. 20. A basic constitution of the digital camera 100, to which this example is applied, is substantially the same as in the first example.

Figure 20:
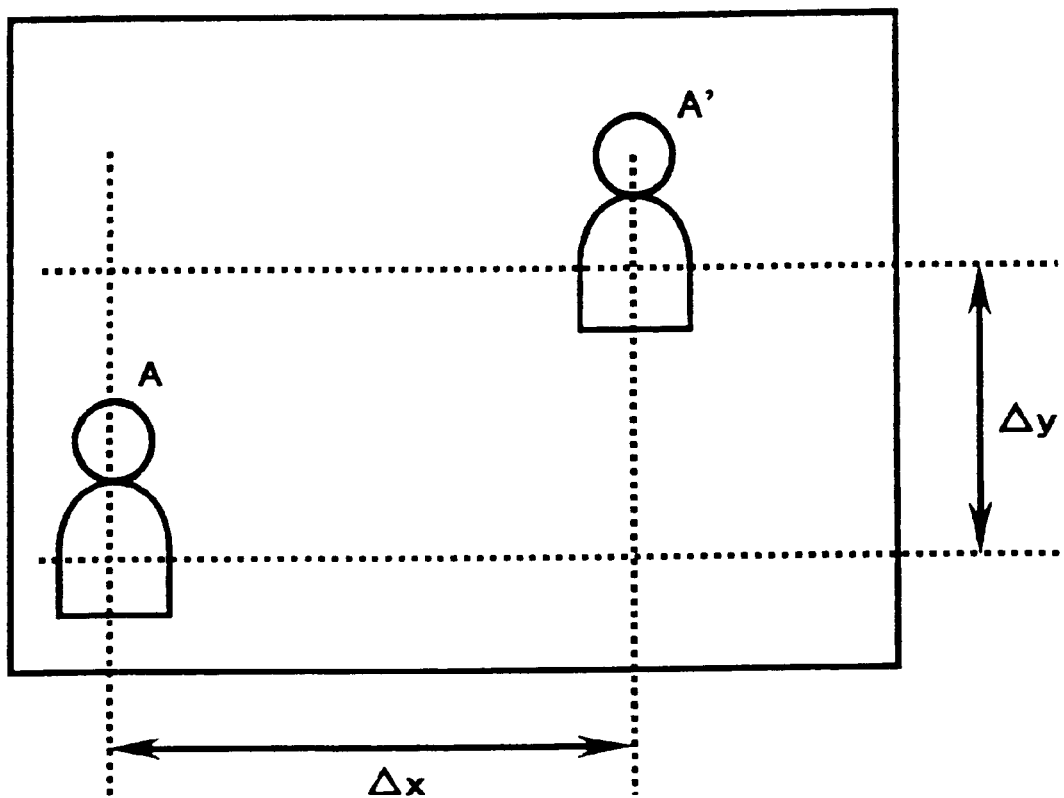
FIG. 20 is a chart that illustrates a constitution of an image movement detecting device of yet another embodiment, in which an area sensor is employed.

As illustrated in FIG. 20, the image movement detecting device 131 may include an area sensor. When the mechanical movement detecting device 130 explained later in detail detects a moving amount $\Delta y'$ per a prescribed time period, for example, an object image A' is formed at a position on the area sensor as illustrated in FIG. 20 after that of an object image A is formed thereon. Then, an image movement signal corresponding to a moving amount $\Delta X$ is detected using two line information groups generated by sensors horizontally arranged, for example.

An image movement signal $\Delta Y$ may be detected using two column information groups generated by sensors vertically arranged at the interval $\Delta X$ for example. Thus, the image movement detecting device 131 may detect both moving amounts $\Delta X$ and $\Delta Y$. The detected amount $\Delta Y$ is more precise than that of $\Delta y'$ detected by the mechanical detecting device 130, because $\Delta Y$ is detected using the correlation phase (wave signal) matching method as explained earlier. Thus, the image movement detecting device 131 may detect a new image movement signal based on the detected image movement signal.

A CCD for an image print of the digital camera 100 can be used for the CCD of the image movement detecting device 131. A constitution of the digital camera may not have high costs in this case.

Hereinbelow, an example of the mechanical movement detecting device 130 is explained referring to FIGS. 21 through 24. This example may be realized using a digital camera 100 having substantially a same basic constitution as in the first example.

Figure 21:
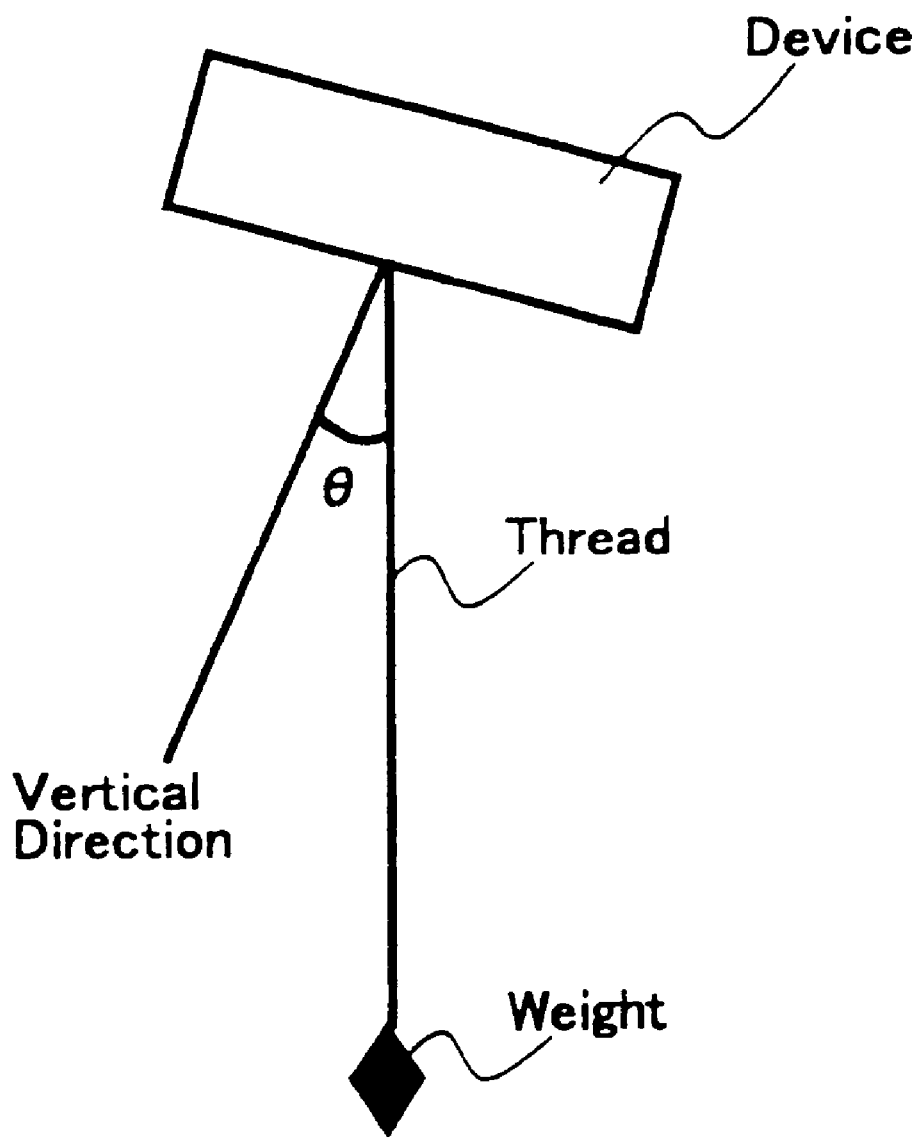
FIGS. 21 through 23 are charts for explaining a principle of detecting a mechanical moving amount of the present invention.

First, a principle of movement of the digital camera (hereinafter referred to as a body in this example) is explained referring to FIG. 21. As illustrated in FIG. 21, a weight is hanging by a thread from the body. The thread vertically extends under influence of gravity. An angle $\theta$ is defined by a line perpendicularly extending from the body and the thread.

Thus, if the angle $\theta$ is detected, an inclination of the body, which is produced by hand movement, is detected.

Figure 22:
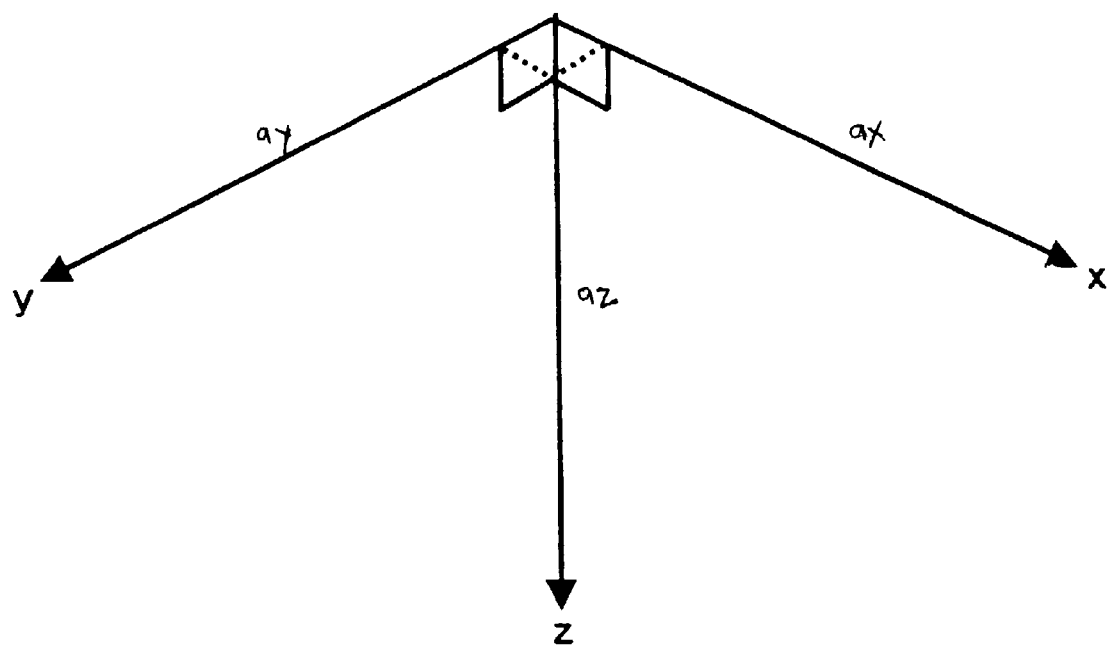

As illustrated in FIG. 22, if a direction of gravity is to be detected, a plurality of acceleration sensors for detecting acceleration outputs ax, ay, and az in directions x, y, and z may be used.

Figure 23:
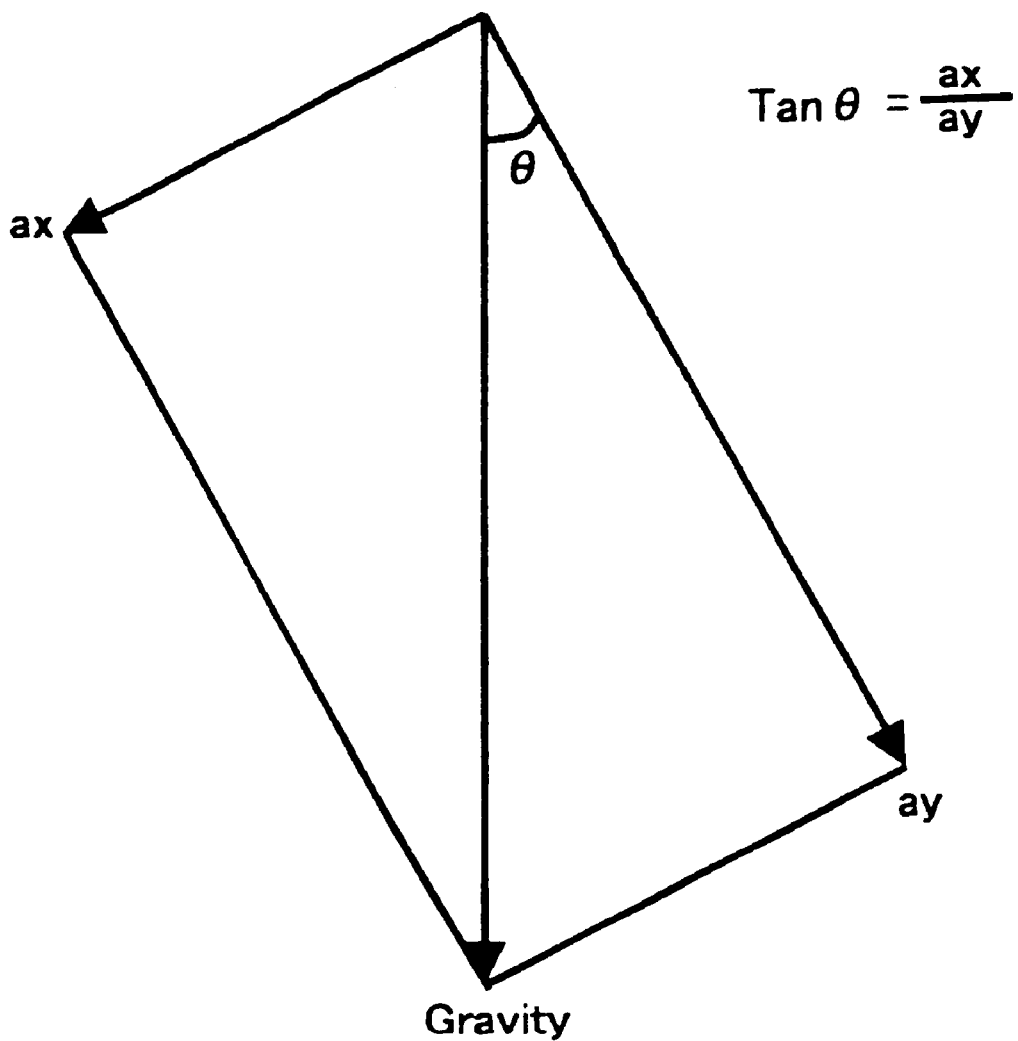

To simplify an explanation, the principle is explained using only two outputs ax and ay referring to FIG. 23. The acceleration sensors may generate outputs ax in the direction X, and ay in the direction Y. An angle $\theta$ between the axis Y and the gravity direction may be calculated by the following formula (4).

$$\tan\theta = ax/ay \quad (4)$$

Thus, if a plurality of acceleration sensors are disposed in a plurality of directions X, Y, and Z respectively, an angle between the gravity direction and each axis can be detected by comparing each output of the acceleration sensors three times. A mechanical moving amount of the body can be detected by detecting a change of the angle θ per a prescribed time period.

Figure 24:
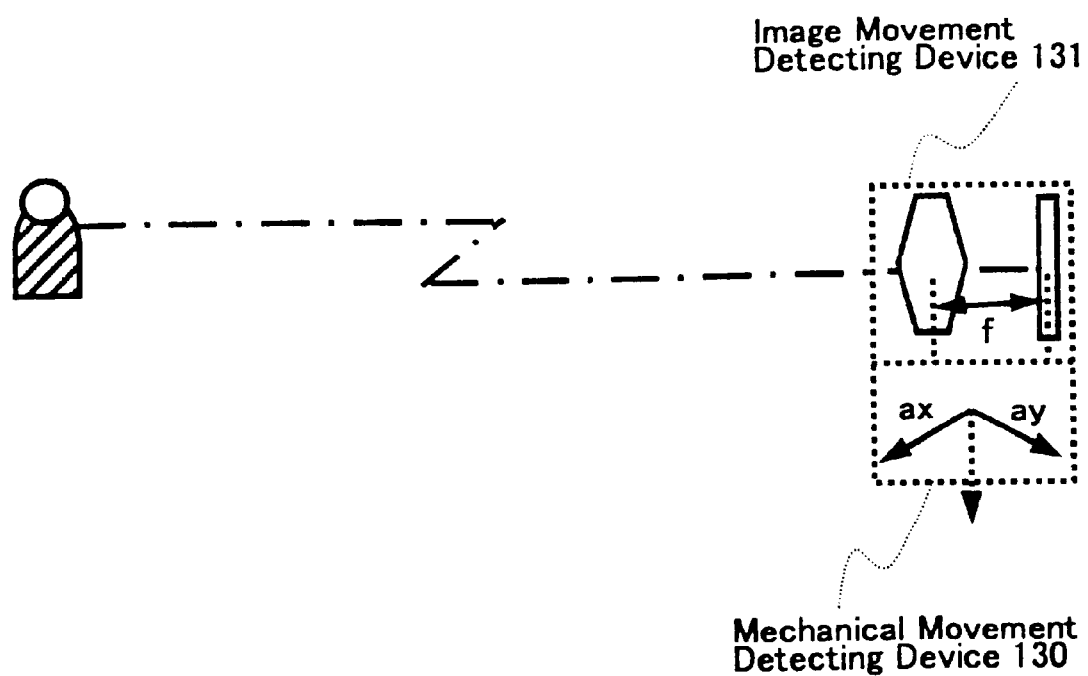
FIGS. 24 and 25 are charts for explaining the principle illustrated in FIGS. 21 through 23 using an acceleration sensor as a mechanical movement detecting device.
Figure 25:
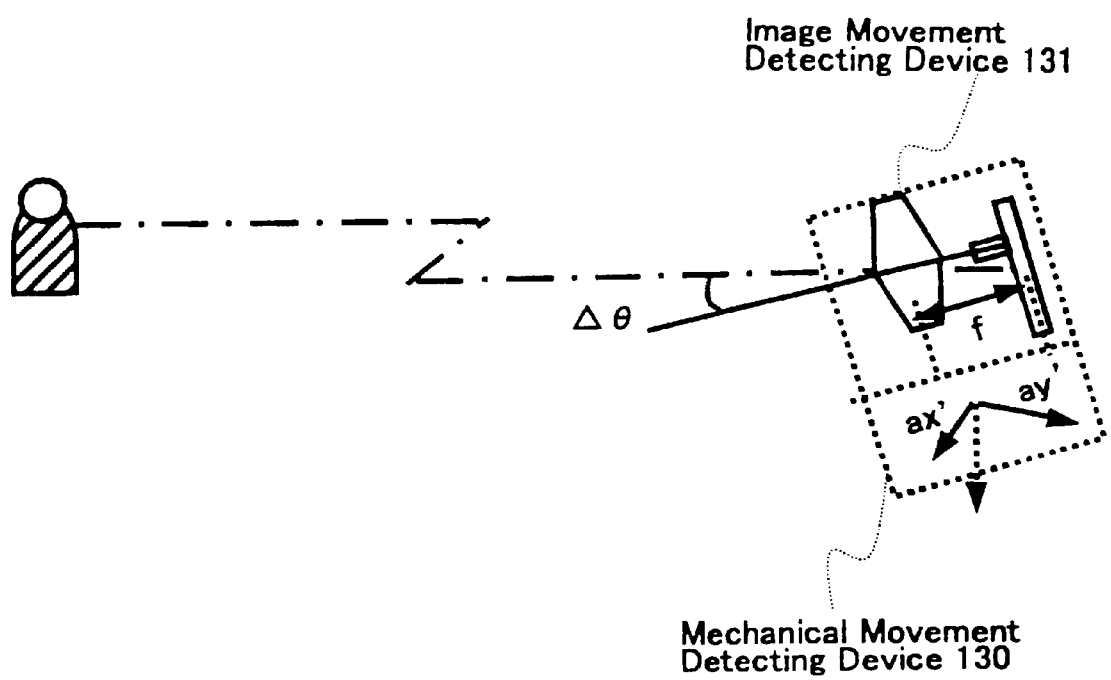

FIGS. 24 and 25 typically illustrate both the mechanical movement detecting device 130 and the image movement detecting device 131. FIG. 24 illustrates a status of the digital camera when it is not inclined, and FIG. 25 illustrates a status of the digital camera when inclined by an angle Δθ. When the body is not inclined as illustrated in FIG. 24, and the mechanical movement detecting device 130 of the acceleration sensor outputs ax and ay, the angle θ between the axis Y of the acceleration sensor and the gravity direction may be represented by ax/ay. When the body is inclined by the angle Δθ due to hand movement as illustrated in FIG. 25, an object image signal may be detected.

Namely, the object image signal may be detected when the object image is moved up or down by the angle Δθ. An amount of tan Δθ may correspond to an amount of P/f when an interval between two line sensors of the image movement detecting device 131 represents P, and a focal distance of the optical unit represents f. Further, Δy as illustrated in FIGS. 6 and 7 may be represented by f tan θ. Thus, as explained earlier referring to FIGS. 6 and 7, when the mechanical movement detecting device 130 detects Δy the object image is formed on the sub-line sensor having a distance P. Further, Δy' as illustrated in FIG. 12 and so on can be a moving amount corresponding to Δθ changed during a prescribed time period.

Hereinbelow, a calculation method for calculating the amount of tan Δθ, namely P/f, is explained. Since Δθ is obtained by subtracting θ' from θ, tan Δθ may correspond to a formula tan(θ'−θ), if θ' represents an angle moved from a position having θ. An amount of P/f is represented in the following formula (5), if a'x and a'y represent outputs generated after hand movement.

$$P/f = \tan\{\tan^{-1}(a'x/a'y) - \tan^{-1}(ax/ay)\}, \quad (5)$$

The above formula is simplified as described below in (6).

$$P/f = (a'x/ay - ax/a'y)/(1 + a'x \cdot ax/a'y \cdot ay) \quad (6)$$

Thus, P/f can be simply represented as described below in (7).

$$P/f = (a'x/ay - ax/a'y)/(a'x \cdot ax/a'y \cdot ay) \quad (7)$$

The amounts of P and f are prescribed setting amounts. Thus, when the acceleration sensor comes to output ax' and ay' meeting the above mentioned formula after outputting ax and ay as illustrated in FIG. 24, a next object image signal can be detected to detect an image moving amount of the object image as illustrated in FIGS. 6 and 7.

Since the plurality of acceleration sensors is used regarding the plurality of axes, and the image movement detecting device 131 is controlled based on the outputs of the acceleration sensors, the object image can only move both right and left on the image movement detecting device 131. Thus, the image movement detecting device 131 can be simple because the image movement detecting device 131 only requires a line sensor to detect the hand movement.

Figure 26:
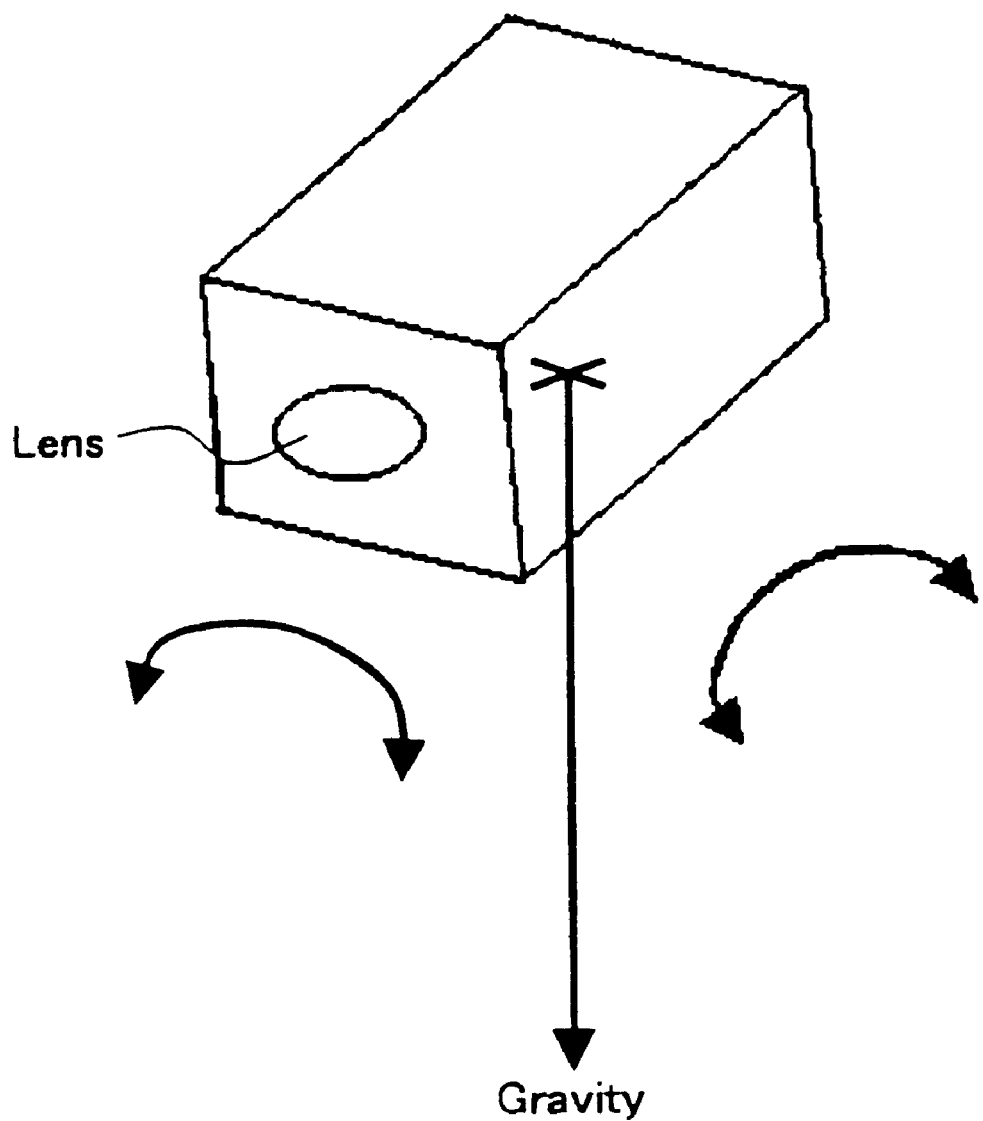
FIG. 26 is a chart that illustrates moving directions to be detected using two acceleration sensors as a mechanical movement detecting device.
Figure 27:
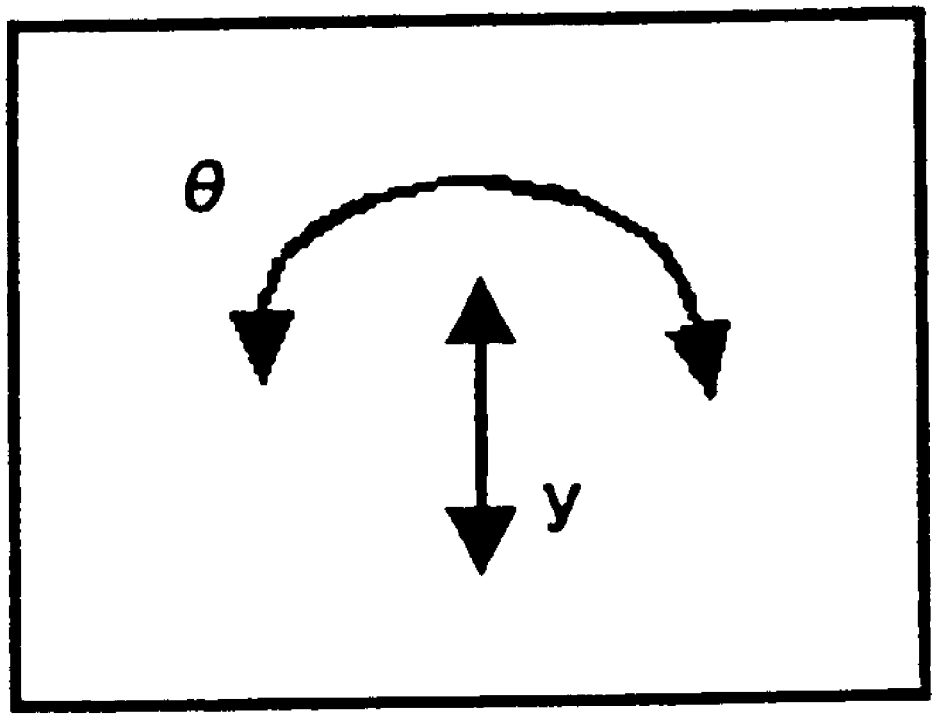
FIG. 27 is a chart that illustrates a moved object image formed on an area sensor as the image movement detecting device when using two acceleration sensor illustrated in FIG. 29.

Further, when the acceleration sensors are set for three axis respectively, two inclinations of the body can be detected in different directions as shown by curved arrows illustrated in FIG. 26. As illustrated in FIG. 27, when viewing the inclinations from an imaging surface of the image movement detecting device 131, movements in both a vertical direction (Y axis) and a rotational direction (θ axis) can be detected.

Figure 28:
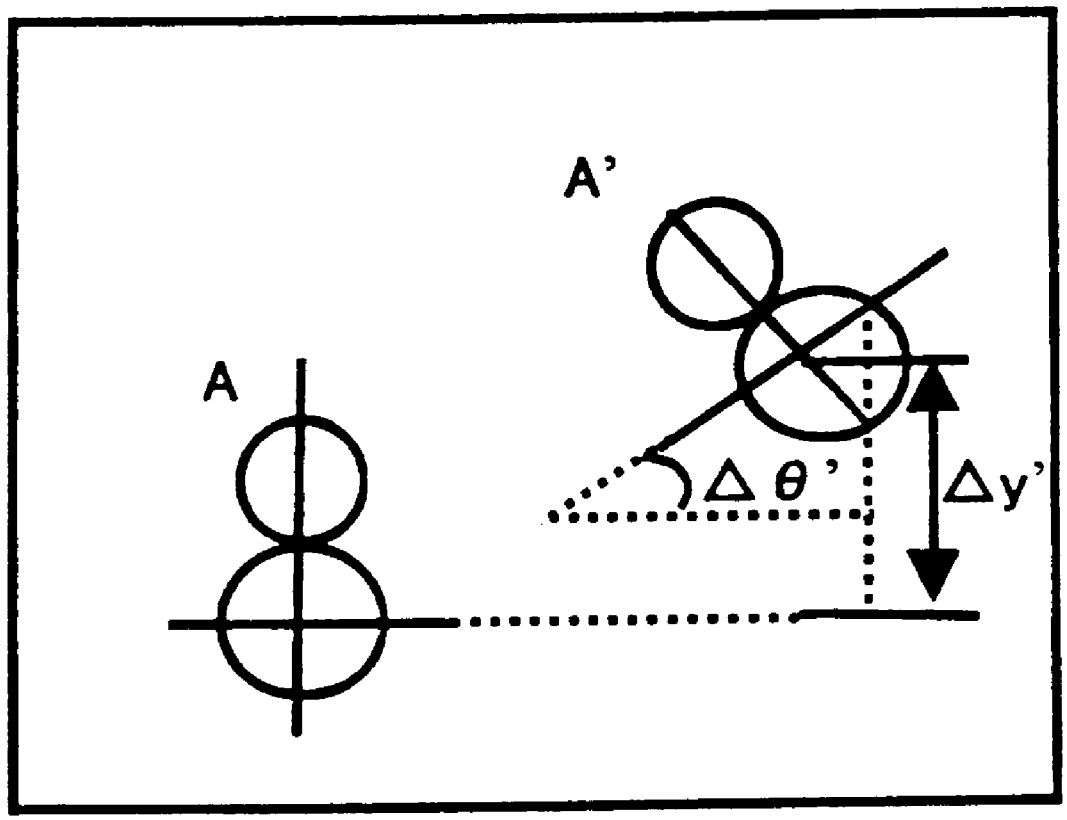
FIGS. 28 through 30 are charts illustrating an operation utilizing three acceleration sensors as the mechanical movement detecting device.
Figure 29:
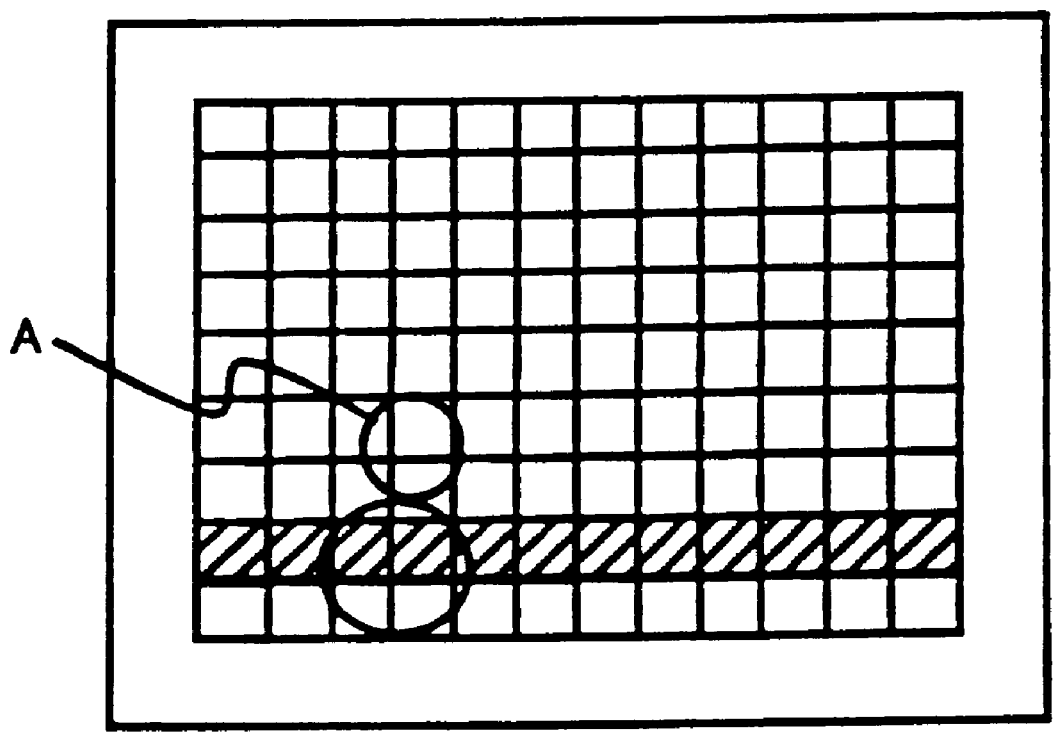
Figure 30:
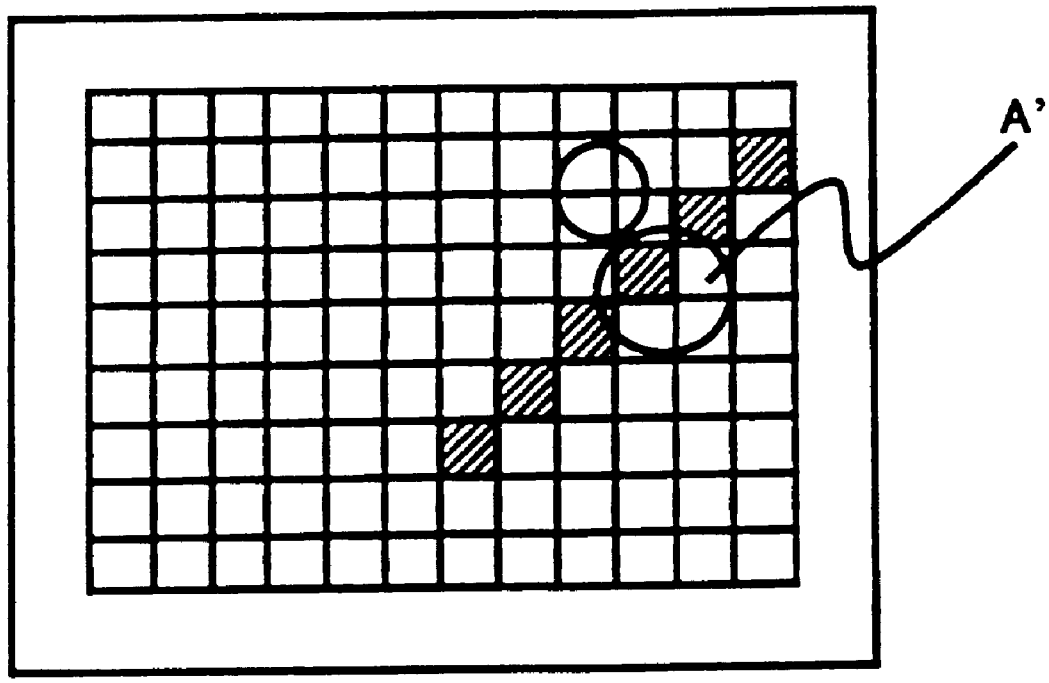

Hereinbelow, one example using three acceleration sensors is explained referring to FIGS. 28 through 30. FIG. 28 illustrates that an object image positioned at A moves to a position A' by rotating by an angle Δθ, and moving by an amount when a prescribed time period has elapsed after occurrence of hand movement. FIGS. 29 and 30 illustrate the object images A and A' formed on the area sensor before and after its movement. An object image signal of an object image positioned at A illustrated in FIG. 29 is first generated and detected, and an object image signal of the object image moved is then generated and detected when the mechanical movement detecting device mentioned above outputs both signals indicating Δθ' and ΔY', thereby a moving amount ΔX may be detected in a same manner as mentioned earlier.

Figure 31:
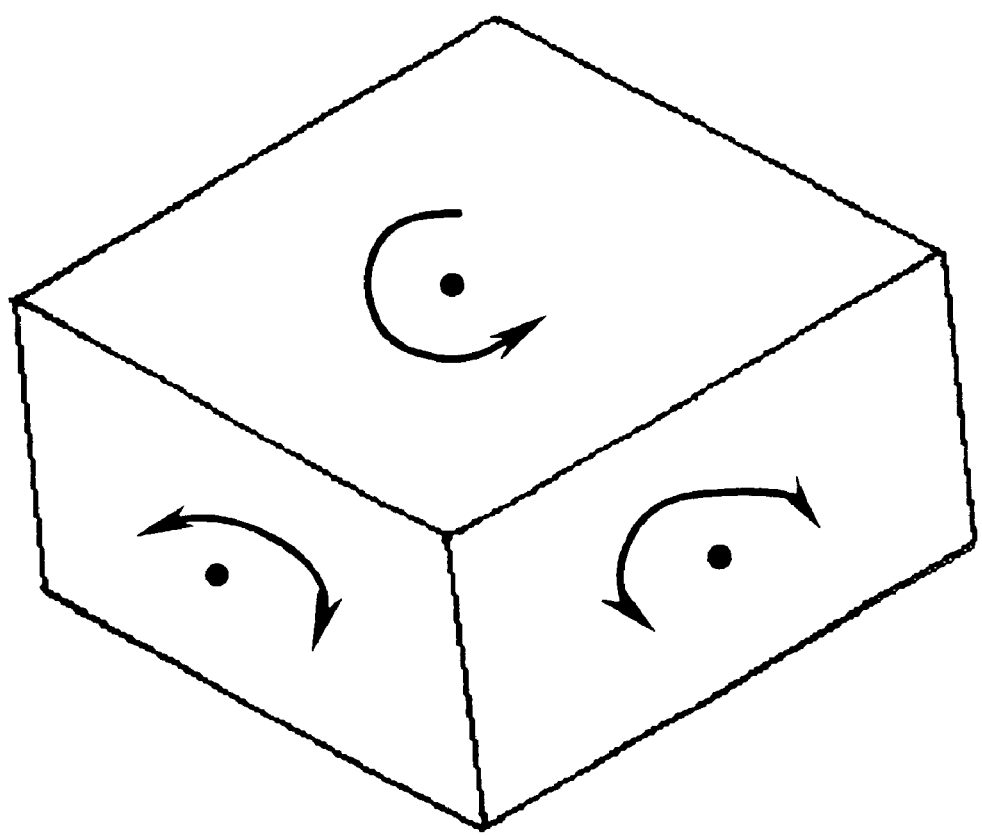
FIG. 31 is a chart that illustrates detectable directions when using three acceleration sensors as the mechanical movement detecting device.

Thus, movement toward three axis directions Δθ, ΔY, and ΔX as illustrated in FIG. 31 can be detected using the three axis acceleration sensor and the image movement detecting device 131.

Figure 32:
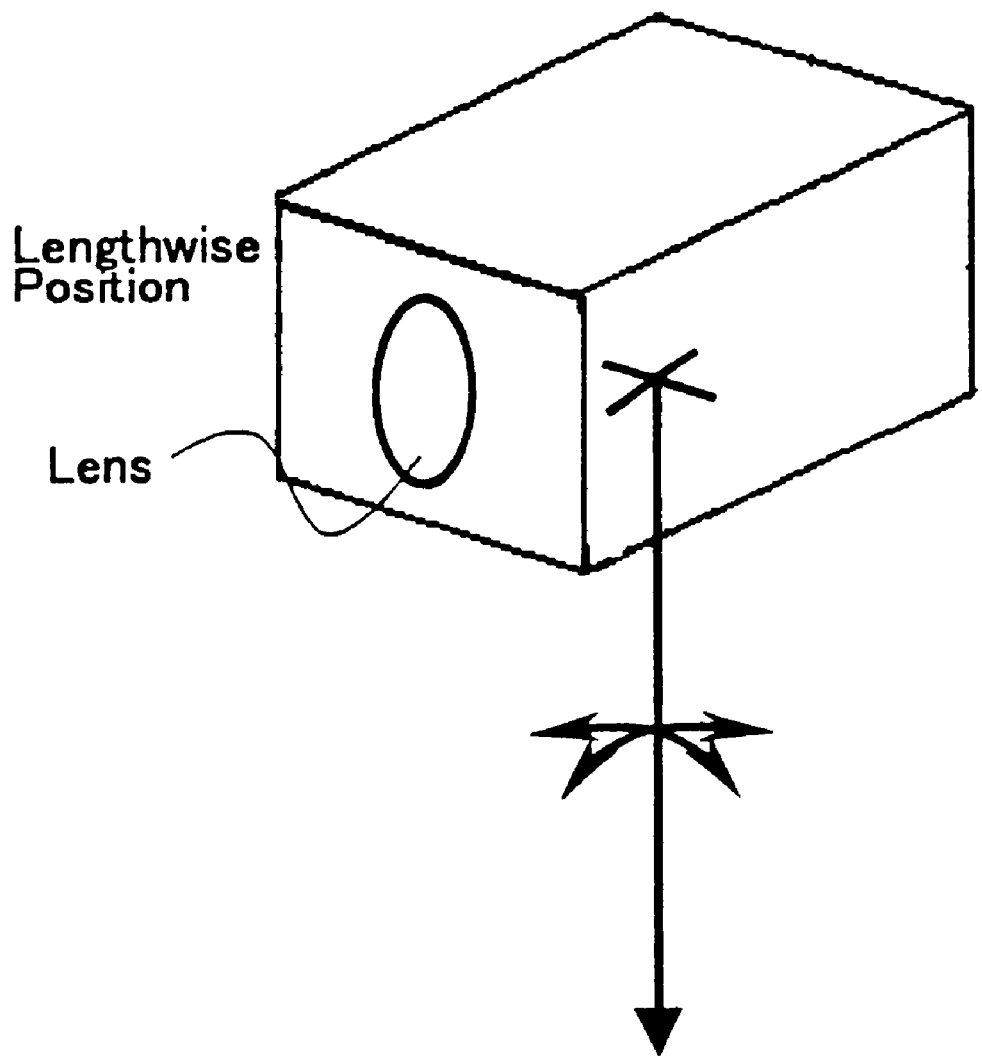
FIGS. 32 through 34 are charts that illustrate detection of an image moving amount when the digital camera is used lengthwise.
Figure 33:
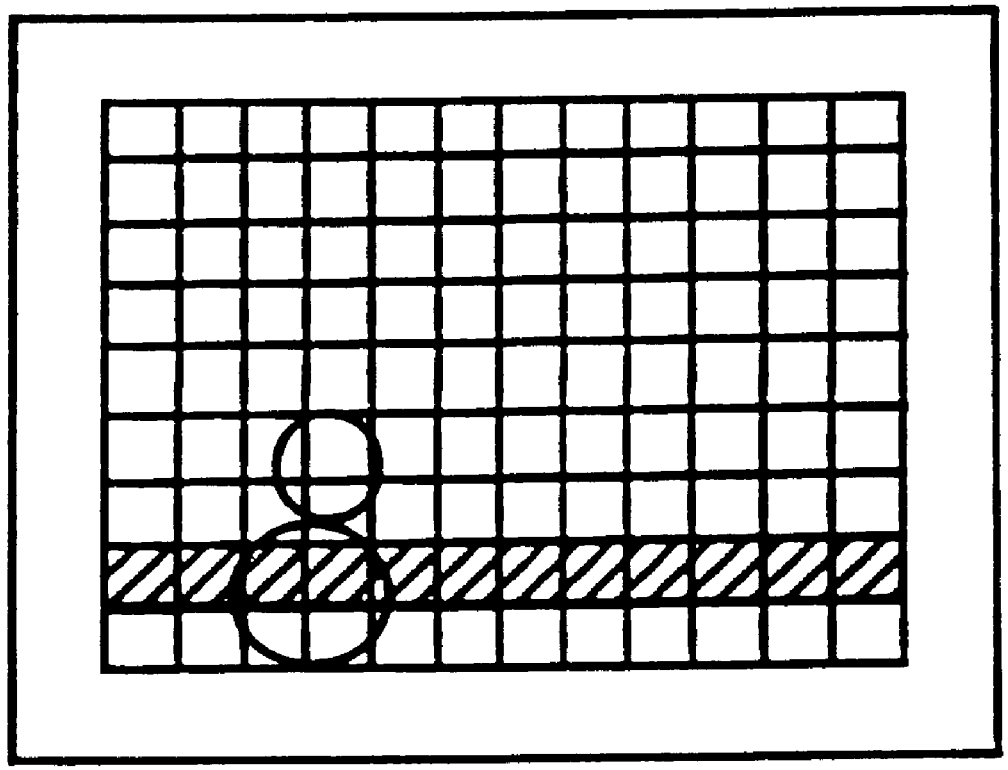
Figure 34:
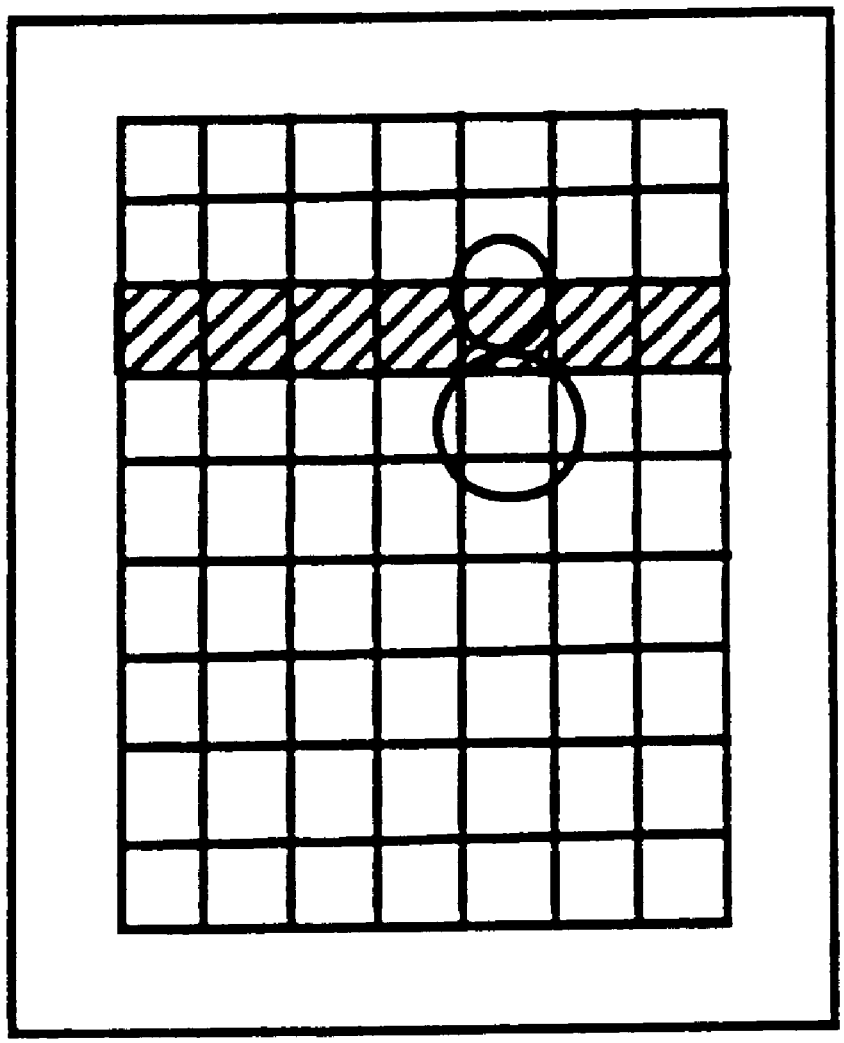

If the digital camera is used lengthwise by turning the body by 90° from it's normal status as illustrated in FIG. 32, an area sensor is used to detect a moving amount of an object image in the following manner. Namely, when using the digital camera lengthwise, the object movement can be detected using information of the object image, which is arranged in a prescribed line to detect the moving amount of the object image as illustrated in FIG. 33. When using the digital camera lengthwise, information of the object image, which is arranged in a prescribed column, may be used to detect the moving amount of the object image as illustrated in FIG. 34.

Thus, the mechanical movement detecting device 130 detects a signal indicating an inclination of the body from the gravity direction, and the image movement detecting device 131 detects an object image moving amount, which can not be detected by detecting the inclination, and thus the digital camera may precisely detect the hand movement without high costs.

An angular velocity sensor or the like can be used for the acceleration sensor. If the angular velocity sensor is used in the mechanical movement detecting device 130 and outputs a signal corresponding to a detected angular velocity, the angular velocity of the body can be detected regardless of the gravity direction. The above-mentioned technology can be used for a video camera, an optical type camera, a vibration suppressing apparatus, and so on.

To avoid hand movement when using a video camera, a prescribed video image printing area can be set based on an image movement signal and a mechanical movement signal. Further, a display area can be set by correcting hand movement using the above-mentioned technology when the video information is reproduced on the display. To execute the reproduction, a whole image information and only a mechanical movement signal are stored beforehand.

Obviously, numerous additional modifications and variations of the present invention are possible in light of above teachings. It is therefore to be understood that within the scope of the appended claims, the present invention may be practiced otherwise than as specifically described herein.

This document is based upon the Japanese Patent application No. 10-163769, filed on Jun. 11, 1998, and the entire contents of which are hereby incorporated by reference.

What is claimed is:

1. A hand movement detecting apparatus for a body including imaging elements and an optical unit, comprising:
   a mechanical movement detecting device configured to detect a mechanical moving amount of the body and to generate a mechanical movement signal indicating the mechanical moving amount when hand movement occurs; and an image movement detecting device configured to detect a moving amount of an object image formed on the imaging elements and to generate an image movement signal indicating the moving amount in response to the mechanical movement signal.

2. A hand movement correction apparatus as claimed in claim 1, wherein:

said image movement detecting device is further configured to form a plurality of object images on the imaging elements during the hand movement and to detect the image moving amount based on a pair of object image signals generated by the imaging elements.

3. A hand movement detecting apparatus as claimed in claim 2, wherein:

said image movement detecting device is further configured to detect the image moving amount by detecting a difference in phase of waveforms of the pair of the object image signals.

4. A hand movement detecting apparatus as claimed in claim 2, wherein:

said image movement detecting device is further configured to determine a timing of a formation of the object image based on the mechanical movement signal.

5. A hand movement detecting apparatus as claimed in claim 2, wherein:

said image movement detecting device is further configured to generate a plurality of object image signals by periodically forming a plurality of object images on the imaging element, and to select a pair of object image signals to compare and detect the image moving amount.

6. A hand movement detecting apparatus as claimed in claim 2, wherein:

said image movement detecting device is further configured to change an angle of an optical axis of the optical unit based on the movement signal, and said image movement detecting device is further configured to detect the image moving amount by detecting object image signals generated after the change of the optical axis.

7. A hand movement detecting apparatus as claimed in claim 2, wherein:

said image movement detecting device is further configured to detect a second image moving amount moved in a direction different from a previously detected direction after detecting said image moving amount.

8. A hand movement detecting apparatus as claimed in claim 2, wherein:

said mechanical movement detecting device is further configured to output a signal as the movement signal indicating an inclination level of the body to the gravity direction.

9. A hand movement detecting apparatus as claimed in claim 1, wherein:

said mechanical movement detecting device is further configured to output a signal indicating a velocity angle of the body as the mechanical movement signal.

10. A hand movement detecting apparatus as claimed in any one of claims 1, 2, 3, 4, 5, 6, 7, 8, and 9, further comprising:

a hand movement correcting device configured to correct hand movement based on the image movement signal and the mechanical movement signal.

11. A hand movement detecting apparatus for a body including imaging elements and an optical unit, comprising:

mechanical movement means for detecting a mechanical moving amount of the body and for generating a mechanical movement signal indicating the mechanical moving amount when hand movement occurs; and image movement detecting means for detecting a moving amount of an object image formed on the imaging elements and for generating an image movement signal indicating the moving amount in response to the mechanical movement signal.

12. A hand movement correction apparatus as claimed in claim 11, wherein:

said image movement detecting means forms a plurality of object images on the imaging elements during the hand movement and detects the image moving amount based on a pair of object image signals generated by the imaging elements.

13. A hand movement detecting apparatus as claimed in claim 12, wherein:

said image movement detecting means detects the image moving amount by detecting a difference in phase of waveforms of the pair of the object image signals.

14. A hand movement detecting apparatus as claimed in claim 12, wherein:

said image movement detecting means determines a timing of a formation of the object image based on the mechanical movement signal.

15. A hand movement detecting apparatus as claimed in claim 12, wherein:

said image movement detecting means generates a plurality of object image signals by periodically forming a plurality of object images on the imaging element, and selects a pair of object image signals to compare and detect the image moving amount.

16. A hand movement detecting apparatus as claimed in claim 12, wherein:

said image movement detecting means changes an angle of an optical axis of the optical unit based on the movement signal, and said image movement detecting means detects the image moving amount by detecting object image signals generated after the change of the optical axis.

17. A hand movement detecting apparatus as claimed in claim 12, wherein:

said image movement detecting means detects a second image moving amount moved in a direction different from a previously detected direction after detecting said image moving amount.

18. A hand movement detecting apparatus as claimed in claim 11, wherein:

said mechanical movement detecting means outputs a signal as the movement signal indicating an inclination level of the body to the gravity direction.

19. A hand movement detecting apparatus as claimed in claim 11, wherein:

said mechanical movement detecting means outputs a signal indicating a velocity angle of the body as the mechanical movement signal.

20. A hand movement detecting apparatus as claimed in any one of claims 11, 12, 13, 14, 15, 16, 17, 18, and 19, further comprising:

hand movement correcting means for correcting hand movement based on the image movement signal and the mechanical movement signal.

* * * * *